US011336967B2

(12) United States Patent
Kitazato et al.

(10) Patent No.: US 11,336,967 B2
(45) Date of Patent: May 17, 2022

(54) RECEIVER APPARATUS, TRANSMITTER APPARATUS, AND DATA PROCESSING METHOD

(71) Applicant: Saturn Licensing LLC, New York, NY (US)

(72) Inventors: Naohisa Kitazato, Tokyo (JP); Yasuaki Yamagishi, Kanagawa (JP); Jun Kitahara, Shizuoka (JP); Taketoshi Yamane, Kanagawa (JP)

(73) Assignee: SATURN LICENSING LLC, New York, NY (US)

(*) Notice: Subject to any disclaimer, the term of this patent is extended or adjusted under 35 U.S.C. 154(b) by 0 days.

(21) Appl. No.: 15/738,150

(22) PCT Filed: Jul. 1, 2016

(86) PCT No.: PCT/JP2016/069593
§ 371 (c)(1),
(2) Date: Dec. 20, 2017

(87) PCT Pub. No.: WO2017/010312
PCT Pub. Date: Jan. 19, 2017

(65) Prior Publication Data
US 2018/0167696 A1    Jun. 14, 2018

(30) Foreign Application Priority Data
Jul. 16, 2015 (JP) .............. JP2015-141786

(51) Int. Cl.
*H04N 21/6543* (2011.01)
*H04N 21/442* (2011.01)
(Continued)

(52) U.S. Cl.
CPC ......... *H04N 21/6543* (2013.01); *G06F 13/00* (2013.01); *H04N 21/258* (2013.01);
(Continued)

(58) Field of Classification Search
CPC .......... H04N 21/6543; H04N 21/6582; H04N 21/44204; H04N 21/437; H04N 21/258;
(Continued)

(56) References Cited

U.S. PATENT DOCUMENTS 8,352,984 B2 *   1/2013   Gogoi ............... H04N 5/44543
                                                       386/296
2002/0033844 A1 * 3/2002  Levy .................... G06F 3/0484
                                                       715/744
(Continued)

FOREIGN PATENT DOCUMENTS

CN    101645905 B    10/2012
CN    104094540 A    10/2014
(Continued)

OTHER PUBLICATIONS

International Search Report dated Aug. 16, 2016 in PCT/JP2016/069593 filed Jul. 1, 2016.
(Continued)

Primary Examiner — Robert J Hance
(74) Attorney, Agent, or Firm — Jeffery J Brosemer

(57) ABSTRACT

The present technology relates to a receiver apparatus, a transmitter apparatus, and a data processing method that are configured to execute an operation related with viewing history in a desired operation mode.
The receiver apparatus receives broadcast waves of digital broadcasting transmitted from the transmitter apparatus via a transmission path, acquires control information for controlling the recording or the transmission of viewing history information related with the viewing history of content transmitted by broadcast waves, and, on the basis of the acquired control information, controls the recording or the transmission of viewing history information. The present
(Continued)

technology is applicable to a television receiver compliant with an IP transmission scheme, for example.

20 Claims, 27 Drawing Sheets

(51) Int. Cl.
| | |
|---|---|
| *H04N 21/258* | (2011.01) |
| *H04N 21/437* | (2011.01) |
| *G06F 13/00* | (2006.01) |
| *H04N 21/858* | (2011.01) |
| *H04N 21/658* | (2011.01) |
| *H04N 21/435* | (2011.01) |
| *H04N 21/475* | (2011.01) |
| *H04N 21/466* | (2011.01) |

(52) U.S. Cl.
CPC ..... *H04N 21/437* (2013.01); *H04N 21/44204* (2013.01); *H04N 21/6582* (2013.01); *H04N 21/8586* (2013.01); *H04N 21/25891* (2013.01); *H04N 21/435* (2013.01); *H04N 21/44222* (2013.01); *H04N 21/4667* (2013.01); *H04N 21/475* (2013.01)

(58) Field of Classification Search
CPC ......... H04N 21/8586; H04N 21/25891; H04N 21/435; H04N 21/475; H04N 21/44222; H04N 21/4667; H04N 21/25866; H04N 21/42646; H04N 21/433; G06F 13/00
See application file for complete search history.

(56) References Cited

U.S. PATENT DOCUMENTS

| | | | |
|---|---|---|---|
| 2002/0107855 A1 | 8/2002 | Nishi | |
| 2006/0015902 A1* | 1/2006 | Matsuura | H04N 7/17318 725/46 |
| 2007/0186237 A1 | 8/2007 | Takatori | |
| 2008/0082921 A1* | 4/2008 | Negi | H04N 5/445 715/704 |
| 2011/0016396 A1 | 1/2011 | Maruyama | |
| 2012/0084802 A1 | 4/2012 | Kitazato | |
| 2012/0239785 A1 | 9/2012 | Pazos | |
| 2013/0042100 A1* | 2/2013 | Bouazizi | H04N 21/6543 713/151 |
| 2013/0271653 A1* | 10/2013 | Kim | H04N 21/437 348/473 |
| 2013/0290999 A1* | 10/2013 | Itakura | H04N 21/252 725/14 |
| 2014/0099078 A1 | 4/2014 | Kitahara et al. | |
| 2015/0052570 A1* | 2/2015 | Lee | H04N 21/435 725/110 |
| 2015/0172783 A1* | 6/2015 | Kim | H04N 21/8458 725/110 |
| 2016/0112671 A1 | 4/2016 | Kitahara et al. | |
| 2016/0180362 A1* | 6/2016 | Brown | G06Q 30/0204 705/7.33 |
| 2017/0070790 A1* | 3/2017 | Misra | H04N 21/439 |
| 2017/0111692 A1* | 4/2017 | An | H04N 21/25891 |
| 2018/0014064 A1* | 1/2018 | Deshpande | H04N 21/442 |
| 2018/0376100 A1 | 12/2018 | Kitahara et al. | |

FOREIGN PATENT DOCUMENTS

| | | | |
|---|---|---|---|
| EP | 1 225 766 A2 | 7/2002 | |
| EP | 1 703 732 A1 | 9/2006 | |
| EP | 2 728 895 A1 | 5/2014 | |
| JP | 2005-311810 A | 11/2005 | |
| JP | 2005-323332 A | 11/2005 | |
| JP | 2009-278651 A | 11/2009 | |
| JP | 2010-283783 A | 12/2010 | |
| JP | 2014-49985 A | 3/2014 | |
| KR | 10-2007-0006382 A | 1/2007 | |
| WO | WO-9949717 A2 * | 10/1999 | ............ H04L 63/20 |
| WO | WO 2015/102381 A1 | 7/2015 | |

OTHER PUBLICATIONS

Extended European Search Report dated Feb. 13, 2019 in Patent Application No. 16824292.3, 14 pages.
"ATSC Candidate Standard: Service Usage Reporting (A/333) Doc. S33-170r1" DVB Organization: S33-170r1-Service-Usage-Reporting. pdf, DVB, Digital Video Broadcasting, XP017848751, Feb. 3, 2016, pp. 1-15.

* cited by examiner

FIG. 3

| SCHEME | OPERATION TYPE OF Usage Reporting TYPE | RECEPTION ENVIRONMENT | OPERATION OF RECEIVER APPARATUS |
|---|---|---|---|
| THE FIRST SCHEME | SUBSCRIPTION UR (Subscription Usage Reporting) | DIRECT RECEPTION | S11: URT TRANSMITTED AS SIGNALING IS RECEIVED (OR ACQUIRED FROM URT SERVER).<br>S12: VIEWING HISTORY LOG IS RECORDED IN LOG SCOPE AND LOG PERIOD ACCORDING TO URT.<br>S13: VIEWING HISTORY LOG IS UPLOADED TO VIEWING HISTORY SERVER IN UPLOAD TIMING ACCORDING TO URT. |
| THE SECOND SCHEME | SUBSCRIPTION UR (Subscription Usage Reporting) | TRIGGER RECEPTION | S21: URLR TRIGGER INFORMATION IS RECEIVED FROM VIDEO STREAM.<br>S22: ACCORDING TO URLR TRIGGER INFORMATION, URT IS ACQUIRED FROM URT SERVER.<br>S23: VIEWING HISTORY LOG IS RECORDED IN LOG RANGE AND LOG INTERVAL ACCORDING TO URT.<br>S24: VIEWING HISTORY LOG IS UPLOADED TO VIEWING HISTORY SERVER IN UPLOAD INTERVAL ACCORDING TO URT. |
| THE THIRD SCHEME | INSTANT UR (Instant Usage Reporting) | DIRECT RECEPTION | S31: VIEWING HISTORY LOG IS ALWAYS RECORDED.<br>S32: URT TRANSMITTED AS SIGNALING IS RECEIVED (OR ACQUIRED FROM URT SERVER).<br>S33: IN LOG SCOPE AND LOG PERIOD ACCORDING TO URT, VIEWING HISTORY LOG IS UPLOADED TO VIEWING HISTORY SERVER. |
| THE FOURTH SCHEME | INSTANT UR (Instant Usage Reporting) | TRIGGER RECEPTION | S41: VIEWING HISTORY LOG IS ALWAYS RECORDED.<br>S42: URU TRIGGER INFORMATION IS RECEIVED FROM VIDEO STREAM.<br>S43: IN LOG SCOPE AND LOG PERIOD ACCORDING TO URU TRIGGER INFORMATION, VIEWING HISTORY LOG IS UPLOADED TO VIEWING HISTORY SERVER. |

FIG. 8

URT
— Log Scope
  · basic
  · +component
  · +record
  · +app
— Log Period
  · periodic one-time/everyday/every week/every month
  · period begin/end
— Upload Timing
  · upload group id
— Uploadgroup
  · id
  · url
  · periodic one-time/everyday/every week/every month
  · begin/end
  · diffusion

FIG. 9

URT Syntax

| Element/Attribute | | | Cardinality | data_type | Description |
|---|---|---|---|---|---|
| URT | | | | | |
| ServiceLog | | | 1..n | | |
| | @BroadcastStreamId | | 1 | unsigned Short | |
| | @ServiceId | | 1 | unsigned Short | |
| | LogUnit | | 1..n | | |
| | | @group | 1 | unsigned Short | UPLOAD GROUP IDENTIFICATION |
| | | scope | 1 | | VIEWING HISTORY LOG SCOPE |
| | | @basic | 1 | boolean | BASIC INFORMATION FLAG |
| | | @comp | 0..1 | boolean | COMPONENT INFORMATION FLAG |
| | | @rec | 0..1 | boolean | RECORD INFORMATION FLAG |
| | | @app | 0..1 | boolean | APPLICATION INFORMATION FLAG |
| | | period | 1 | | VIEWING HISTORY LOG PERIOD |
| | | @periodic | 0..1 | char | PERIOD INFORMATION "onetime", "hourly", "daily", "weekly", "monthly" |
| | | @begin | 1 | DateTime | LOG START TIME |
| | | @end | 1 | DateTime | LOG END TIME |
| | Upload·group | | 1..n | | UPLOAD |
| | | @id | 1 | unsigned Short | UPLOAD GROUP IDENTIFICATION |
| | | @uri | 1 | anyURI | UPLOAD DESTINATION URL |
| | | @periodic | 0..1 | char | PERIOD INFORMATION "onetime", "hourly", "daily", "weekly", "monthly" |
| | | @begin | 1 | DateTime | UPLOAD TIMING START TIME |
| | | @end | 0..1 | DateTime | UPLOAD TIMING END TIME |
| | | @diffusion | 0..1 | interger | DIFFUSION PARAMETER |

FIG. 10

CDM Syntax Log-Scope

| Element/Attribute | Cardinality | basic | +rec | +comp | +app |
|---|---|---|---|---|---|
| CDM | | | | | |
| @protocolVersion | 1 | ○ | | | |
| AVChannel | 0..n | ○ | | | |
| @BroadcastStreamId | | ○ | | | |
| @ServiceId | | ○ | | | |
| ViewInterval | 0..n | ○ | | | |
| @startTime | 1 | ○ | | | |
| @endTime | 1 | ○ | | | |
| @presentRecord | 1 | p/r/p+r | | | |
| @viewStartTime | 0..1 | | ○ | | |
| @viewEndTime | 0..1 | | ○ | | |
| DOInterval | 0..n | | | | |
| AppId | 1 | | | | ○ |
| @startTime | 1 | | | | ○ |
| @endTime | 1 | | | | ○ |
| Component | 0..n | | | ○ | |
| @componentId | 1 | | | ○ | ○ |
| @pathType | 1 | | | ○ | ○ |
| @startTime | 1 | | | ○ | |
| @endTime | 1 | | | ○ | |

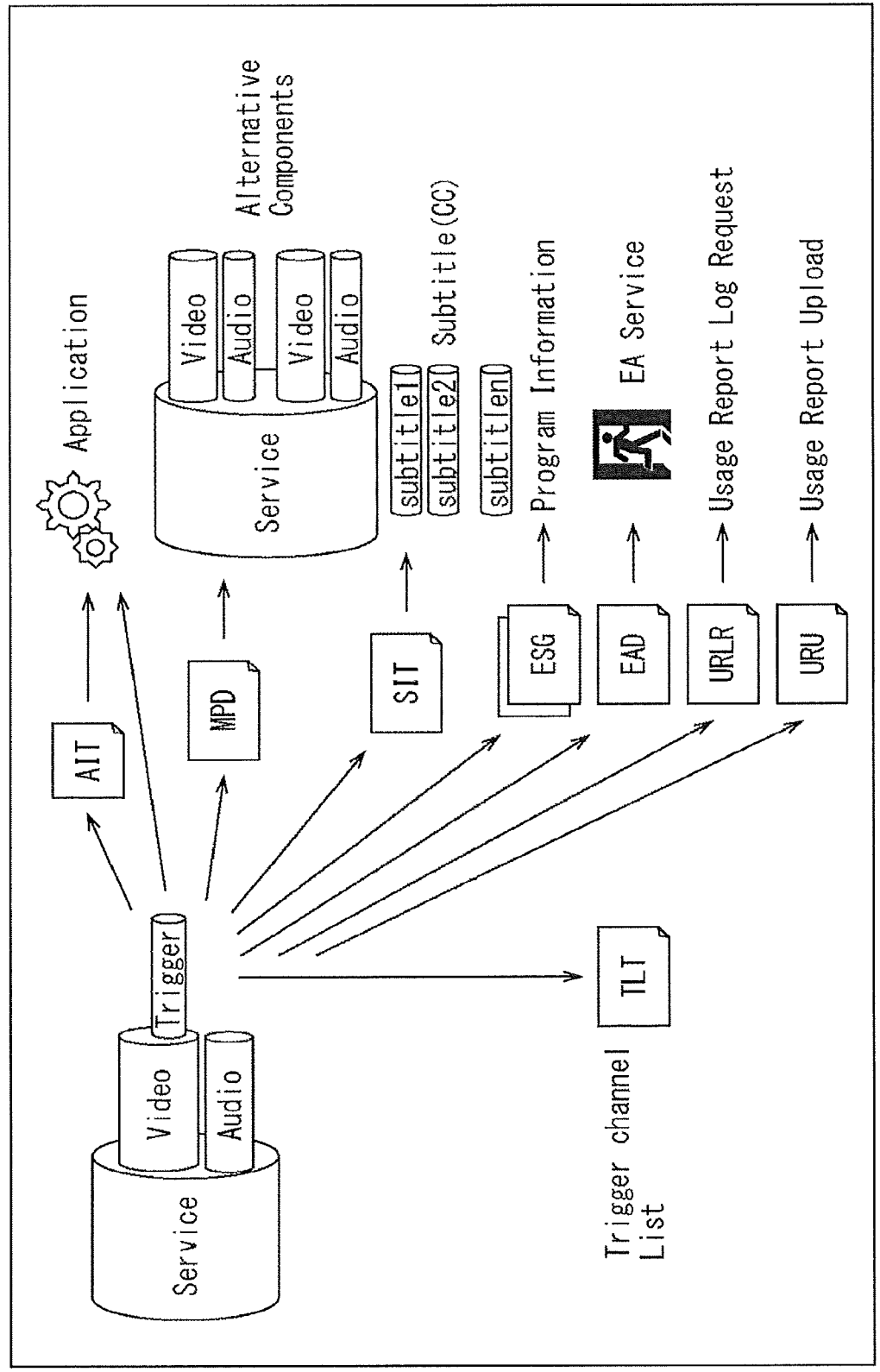

FIG.12

| syntax | No.of Bits | format | description |
|---|---|---|---|
| Trigger_data() { | | | |
|   number_of_trigger | 4 | uimsbf | NUMBER OF TRIGGERS N |
|   trigger_map_number | 4 | uimsbf | NUMBER OF TRIGGER MAPS M 16M bits |
|   trigger_name_flag | 1 | bslbf | TRIGGER NAME FLAG |
|   for(i=0;i<N;i++) { | | | |
|     channel ID | 8 | uimsbf | TRIGGER CHANNEL ID |
|     cmdID | 8 | uimsbf | TRIGGER TYPE |
|     version | 8 | uimsbf | VERSION OF EVERY TRIGGER CHANNEL |
|     length | 8 | uimsbf | NUMBER OF TRIGGER BYTES |
|     if(trigger_name_flag==1) { | | | |
|       name_length | 8 | uimsbf | TRIGGER NAME LENGTH |
|       for(j-0;j<L;j++) { | | | |
|         trigger_name_byte | 8 | bslbf | TRIGGER NAME |
|       } | | | |
|     } | | | |
|   } | | | |
|   for(i=0;i<M;i++) { | | | |
|     trigger_map_bits | 16 | bslbf | TRIGGER MAP: BIT MAP INDICATIVE OF TRIGGER TYPE CURRENTLY TRANSMITTED |
|   } | | | |
|   for(i=0;i<N;i++) { | | | |
|     for(j=0;j<L;j++) { | | | |
|       URI_byte | 8 | bslbf | TRIGGER BODY = URI |
|     } | | | |
|   } | | | |
| } | | | |

FIG. 13

| cmdID | Function | URI | description |
|---|---|---|---|
| 0 | Trigger List Access | TLT URL | GET Trigger channel List TO GET Trigger channel Map |
| 1 | App access1 | AIT URL | APPLICATION CONTROL VIA AIT (+ other App Sig file) |
| 2 | App access2 | App entry URL | APPLICATION DIRECT CONTROL |
| 3 | SC access | MPD URL | HYBRID DISTRIBUTION REPRODUCTION VIA MPD |
| 4 | Subtitle Access | Signaling/TTML URL | TTML DISTRIBUTION + Trigger DIRECT SUBTITLE DISTRIBUTION |
| 5 | ESG Access | ESG URL | ESG |
| 6 | EAS Access | EAS URL | EAS DISTRIBUTION + Trigger DIRECT EA SERVICE |
| 7 | Rating Access | RRT URL | RRT DISTRIBUTION + Trigger DIRECT RATING SPECIFICATION |
| 8 | PDI Access & Upload | PDI | PDI answer upload IS INVOKED FROM PDI Query DISTRIBUTION TO EXECUTE PERSONAL INFORMATION COLLECTION |
| 9 | Usage Report Log Request | URT Server URL | VIEWING HISTORY LOG ACQUISITION REQUEST |
| 10 | Usage Report Upload | UR upload Server URL | VIEWING HISTORY LOG UPLOAD |

FIG. 14

Usage Report Log Request Trigger format

- Trigger URI format
    Trigger = locator_part [ "?" terms ]
- locator_part: URT file URL
- terms : diffusion

- <diffusion>
  — diffusion "d=" 1*digit

FIG.15

Usage Report Upload Trigger format

- Trigger URI format
  Trigger = locator_part [ "?" terms ]
- locator_part. CDM file upload URL
- terms . target_period[scope]["&"diffusion]
- ⟨target_period⟩
  — LOG PERIOD SUBJECT TO UPLOAD
  — target_period="b=" 1*10hexdigit["&e=" 1*10hexdigit]
- ⟨scope⟩
  — LOG SCOPE SUBJECT TO UPLOAD
  — scope=["s=" scope_option]*
  — scope_option=("comp" | "rec" | "app")
- ⟨diffusion⟩
  — diffusion ="d=" 1*digit

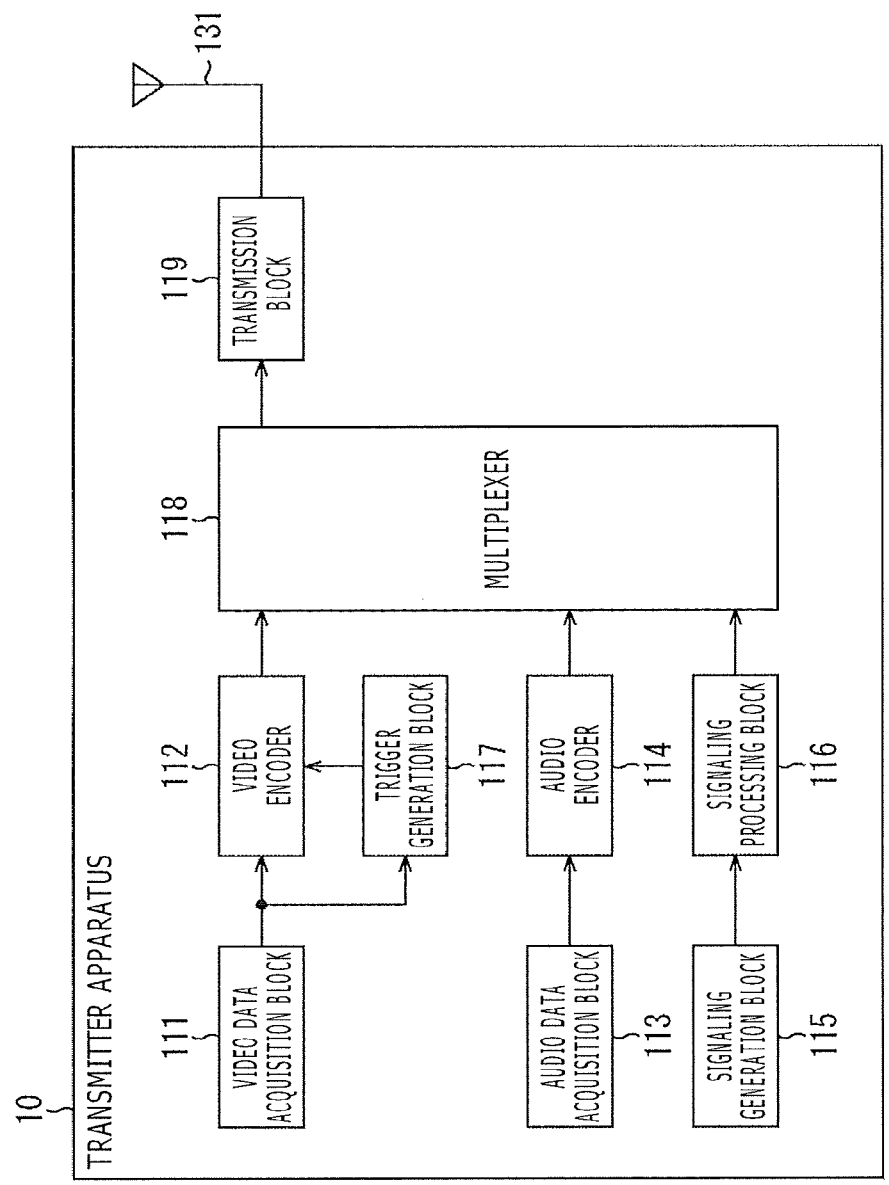

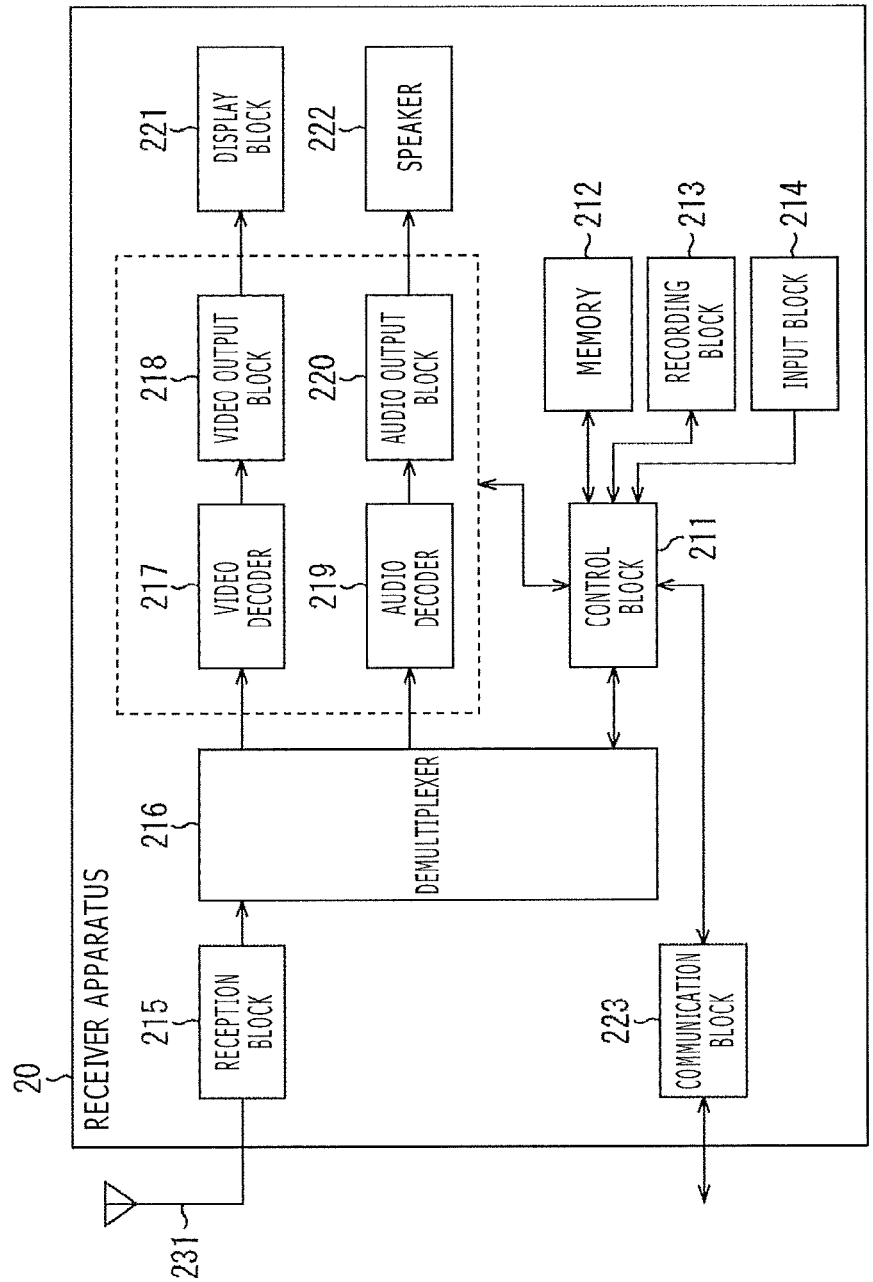

RECEIVER APPARATUS, TRANSMITTER APPARATUS, AND DATA PROCESSING METHOD

TECHNICAL FIELD

The present technology relates to a receiver apparatus, a transmitter apparatus, and a data processing method and, more particularly, to a receiver apparatus, a transmitter apparatus, and a data processing method that are configured to allow an operation related with a viewing history in a desired operation mode.

BACKGROUND ART

In the area of broadcasting, an operation is sometimes done that is related with viewing history, such as the collection and analysis of the viewing history of content. For example, a technology is disclosed that transmits viewing history regularly or on an on-demand basis (refer to PTL 1 below, for example).

CITATION LIST

Patent Literature

[PTL 1]
JP 2009-278651A

SUMMARY

Technical Problem

Since no technological scheme has been established for realizing operations related with viewing history, proposals for executing operations related with viewing history in a desired operation mode have been required.

The present technology, developed in consideration of the above-mentioned situation, is intended to do an operation related with viewing history in a desired operation mode.

Solution to Problem

In carrying out the present technology and according to a first aspect thereof, there is provided a receiver apparatus. This receiver apparatus has a reception block configured to receive a broadcast wave of digital broadcasting, an acquisition block configured to acquire control information for controlling one of recording or transmission of viewing history information related with a viewing history of content that is transmitted by the above-mentioned broadcast wave, and a control block configured to control one of recording or transmission of the above-mentioned viewing history information on the basis of the above-mentioned control information.

The receiver apparatus according to the first aspect of the present technology may be a discrete apparatus or an internal block making up one unit of apparatus. Further, a data processing method according to the first aspect of the present technology is a data processing method that corresponds to the above-mentioned receiver apparatus of the first aspect of the present technology.

In the receiver apparatus and the data processing method according to the first aspect of the present technology, control information for controlling the recording or the transmission of a viewing history information related with a viewing history of content that is transmitted by a broadcast wave of digital broadcasting is acquired and, on the basis of the above-mentioned control information, the recording or the transmission of the above-mentioned viewing history information is controlled.

A transmitter apparatus according to a second aspect of the present technology has a generation block configured to generate control information for controlling the recording or the transmission of viewing history information related with a viewing history of content and a transmission block configured to transmit the above-mentioned control information by a broadcast wave of digital broadcasting along with the above-mentioned content.

The transmitter apparatus according to the second aspect of the present technology may be a discrete apparatus or an internal block making up one unit of apparatus. Further, a data processing method according to the second aspect of the present technology is a data processing method that corresponds to the above-mentioned transmitter apparatus of the second aspect of the present technology.

In the transmitter apparatus and the data processing method according to the second aspect of the present technology, control information for controlling the recording or the transmission of viewing history information related with a viewing history of content is generated and the generated control information is transmitted by a broadcast wave of digital broadcasting along with the above-mentioned content.

A transmitter apparatus according to a third aspect of the present technology has a trigger generation block configured to generate trigger information including information related with the recording or the transmission of viewing history information related with a viewing history of content and a transmission block configured to transmit the above-mentioned trigger information as included in a broadcast wave of digital broadcasting along with the above-mentioned content.

The transmitter apparatus according to the third aspect of the present technology may be a discrete apparatus or an internal block making up one unit of apparatus. Further, a data processing method according to the third aspect of the present technology corresponds to the transmitter apparatus according to the third aspect of the present technology.

In the transmitter apparatus and the data processing method according to the third aspect of the present technology, trigger information that includes information related with the recording or the transmission of viewing history information related with a viewing history of content is generated and this generated trigger information is transmitted as included in a broadcast wave of digital broadcasting along with the above-mentioned content.

Advantageous Effects of Invention

According to the first aspect through the third aspect of the present technology, an operation related with viewing history can be executed in a desired operation mode.

It should be noted that the effect described above is not necessarily limited thereto; that is, any effects described in the present disclosure constitute the effects of the invention.

BRIEF DESCRIPTION OF DRAWINGS

FIG. 3 is a diagram illustrating an operation of a receiver apparatus in accordance with an operation mode of Usage Reporting.

FIG. 8 is a diagram for describing an overview of URT (Usage Report Table) metadata.

FIG. 9 is a diagram for describing an example of a syntax of URT metadata.

FIG. 10 is a diagram for describing an example of syntax of CDM (Consumption Data Message).

FIG. 11 is a diagram for describing an example of an overview of control by use of trigger information.

FIG. 12 is a diagram for describing an example of a syntax of trigger information.

FIG. 13 is a diagram illustrating types of trigger information in accordance command IDs (Identifiers).

FIG. 14 is a diagram illustrating an example of a format of URLR (Usage Report Log Request) trigger information.

FIG. 15 is a diagram illustrating an example of a format of URU (Usage Report Upload) trigger information.

FIG. 16 is a diagram illustrating an example of a configuration of a transmitter apparatus.

FIG. 17 is a diagram illustrating an example of a configuration of a receiver apparatus.

DESCRIPTION OF EMBODIMENTS

Figure 1:
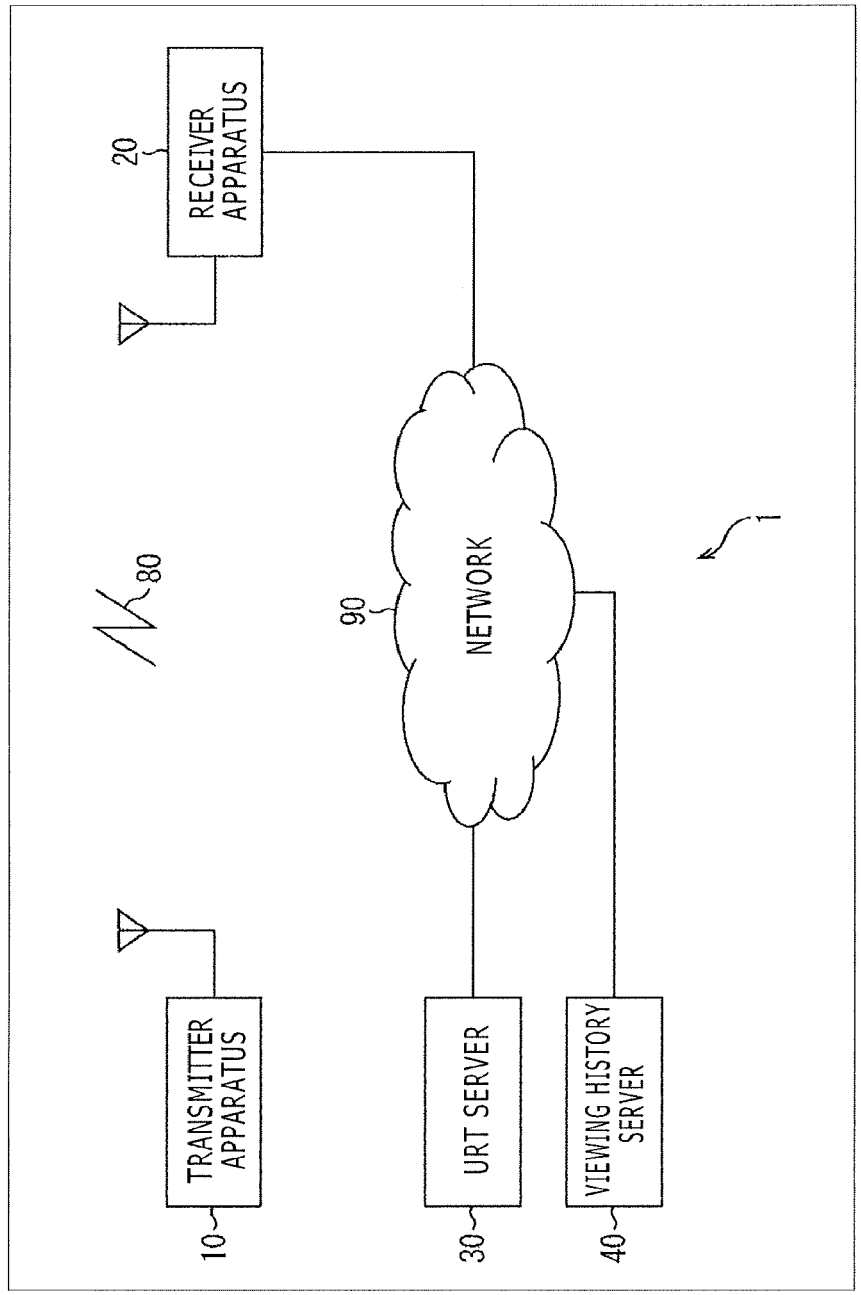
FIG. 1 is a diagram illustrating a configuration of one embodiment of a transmitting system to which the present technology is applied.

The following describes embodiments of the present technology with reference to the drawings. It should be noted that the description is done in a sequence that follows.

1. System configuration
2. Operation related with viewing history
(1) A first scheme: subscription UR (direct reception)
(2) A second scheme: subscription UR (trigger reception)
(3) A third scheme: instant UR (direct reception)
(4) A fourth scheme: instant UR (trigger reception)
3. Detail specifications of each piece of data used in an operation related with viewing history
(1) URT metadata structure
(2) CDM structure
(3) Trigger information structure
4. Apparatus configurations
5. Flows of processing to be executed in each apparatus
6. Variations
7. Computer configuration 1. System Configuration Configurational Example of Transmission System Now, referring to FIG. 1, there is depicted a diagram illustrating an configuration of one embodiment of a transmission system to which the present technology is applied. It should be noted that term "system" denotes a logical collection of two or more apparatuses.

In FIG. 1, a transmission system 1 has a transmitter apparatus 10, a receiver apparatus 20, a URT server 30, and a viewing history server 40.

In this transmission system 1, data transmission compliant with a digital broadcasting standard such as ATSC 3.0, for example, is executed between the transmitter apparatus 10 and the receiver apparatus 20 via a transmission path 80. ATSC 3.0 is the next generation ATSC (Advanced Television Systems Committee) standard that is currently being formulated. In addition, in the transmission system 1 depicted in FIG. 1, the receiver apparatus 20, the URT server 30, and the viewing history server 40 are connected to a network 90 so as to be communicable with each other. It should be noted that the network 90 is a communication line such as the Internet.

The transmitter apparatus 10 is a transmitter compliant with a digital broadcasting standard such as ATSC 3.0. The transmitter apparatus 10 transmits a stream of video, audio, and subtitles (components) that make up the content of a television program and the like via the transmission path 80 as digital broadcast signals.

Further, the transmitter apparatus 10 is enabled to transmit URT (Usage Report Table) metadata as included in a digital broadcast signal as signaling. URT metadata is control information for controlling the recording or transmission of viewing history information (a viewing history log) related with a content viewing history. It should be noted that a detail configuration of URT metadata will be described later with reference to FIG. 8 and FIG. 9. For a viewing history log, CDM (Consumption Data Message), for example, may be used. It should be noted that a detail configuration of CDM will be described later with reference to FIG. 10. Since CDM is provided as a file of XML (Extensible Markup Language), CDM is also referred to as a CDM file in the description below.

Further, the transmitter apparatus 10 is enabled to transmit trigger information for providing various kinds of functions by including in a digital broadcast signal. The trigger information includes URLR (Usage Report Log Request) trigger information and URU (Usage Report Upload) trigger information. It should be noted that a detail configuration of a URLR trigger information will be described later with reference to FIG. 14. A detail configuration of URU trigger information will be described later with reference to FIG. 15.

Trigger information such as URLR trigger information and URU trigger information can be transmitted by use of a watermark of video or audio that makes up content. In what follows, the case in which URLR trigger information and URU trigger information are transmitted by use of a video watermark is described by way of example.

The receiver apparatus 20 is a receiver compliant with a digital broadcasting standard such as ATSC 3.0 which is a stationary receiver such as a television receiver or a set top box or a mobile receiver such as a smartphone or a mobile phone, or a tablet computer, for example. Further, the receiver apparatus 20 may be a device that is installed in an automobile such as an onboard television, for example.

The receiver apparatus 20 receives a digital broadcast signal transmitted from the transmitter apparatus 10 via the transmission path 80, acquires a stream of video, audio, and subtitles and the like (components), processes the acquired stream, and outputs the video and audio of content such as a television program.

In addition, the receiver apparatus 20 can receive and acquire URT metadata or trigger information included in a digital broadcast signal transmitted from the transmitter apparatus 10 via the transmission path 80. Also, on the basis of URLR trigger information, the receiver apparatus 20 can access the URT server 30 via the network 90 so as to acquire URT metadata. That is, the receiver apparatus 20 can acquire URT metadata via broadcasting or via communication.

The receiver apparatus 20 always records a viewing history log as a product function, for example, or, on the basis of URT metadata acquired as signaling, records a viewing history log. Then, on the basis of URT metadata or URU trigger information, the receiver apparatus 20 transmits the recorded viewing history log to the viewing history server 40 via the network 90.

The URT server 30 is a server for providing URT metadata. In response to a request from the receiver apparatus 20, the URT server 30 provides URT metadata to the receiver apparatus 20 via the network 90.

The viewing history server 40 is a server for collecting and processing viewing history logs transmitted from two or more receiver apparatuses 20 via the network 90. The viewing history server 40 is provided by not only a single broadcasting organization but also a jointly operated organization set up by two or more broadcasting organizations or a third party organization (an agent organization dedicated to viewing rate research, for example) not related with any broadcasting organizations.

The configuration of the transmission system is as described above.

It should be noted that, in FIG. 1, the description was done by illustrating one unit of the transmitter apparatus 10 and one unit of the receiver apparatus 20 for the convenience of description; actually, the transmission system has the transmitter apparatuses 10-1 through 10-$i$ (i being an integer equal to or higher than 1) and the receiver apparatuses 20-1 through 20-$j$ (j being an integer equal to or higher than 1). In addition, in FIG. 1, the transmission path 80 can be realized by a terrestrial channel, a satellite line, or a cable television network (a wired line), for example.

Protocol Stack

In ATSC 3.0, it is determined to use, for data transmission, IP/UDP packet, namely, IP (Internet Protocol) packet including UDP (User Datagram Protocol) packet, rather than TS (Transport Stream) packet.

Further, in ATSC 3.0, ROUTE (Real-Time Object Delivery over Unidirectional Transport) and MMT (MPEG (Moving Picture Experts Group) Media Transport) exist at the same time as transport protocols, any one of which is used to transmit a steam of video, audio, and subtitles (components).

Here, ROUTE is a protocol obtained by extending FLUTE (File Delivery over Unidirectional Transport) that is suited for unidirectionally transferring a binary file in a multicast manner. MMT is a transport scheme for use on IP (Internet Protocol) and allows the reference of data such as video and audio by setting IP address and URL (Uniform Resource Locator) by control information.

Further, in ATSC 3.0, it is assumed to specify LLS (Link Layer Signaling) signaling information and SLS (Service Layer Signaling) signaling information as signaling, so that the SLS signaling information for each service is acquired in accordance with the information described in the LLS signaling information acquired in advance.

Here, LLS signaling information includes metadata such as SLT (Service List Table) and URT (Usage Report Table), for example. SLT metadata includes information indicative of configurations of a stream and a service in a broadcasting network, such as information (station selection information) necessary for selecting a service. URT metadata provides control information for controlling the recording or transmission of a viewing history log.

SLS signaling information includes metadata such as USD (User Service Description), LSID (LCT Session Instance Description), and MPD (Media Presentation Description), for example. USD metadata includes information about the acquire destination of other metadata. LSID metadata provides control information of ROUTE protocol. MPD metadata provides control information for managing the reproduction of a stream of components.

It should be noted that metadata such as USD, LSID, and MPD are described in a markup language such as XML. MPD metadata is compliant with the standard of MPEG-DASH (Dynamic Adaptive Streaming over HTTP). In the description done above, URT metadata is transmitted as LLS signaling information; however, it is also practicable to transmit URT metadata as SLS signaling information.

Figure 2:
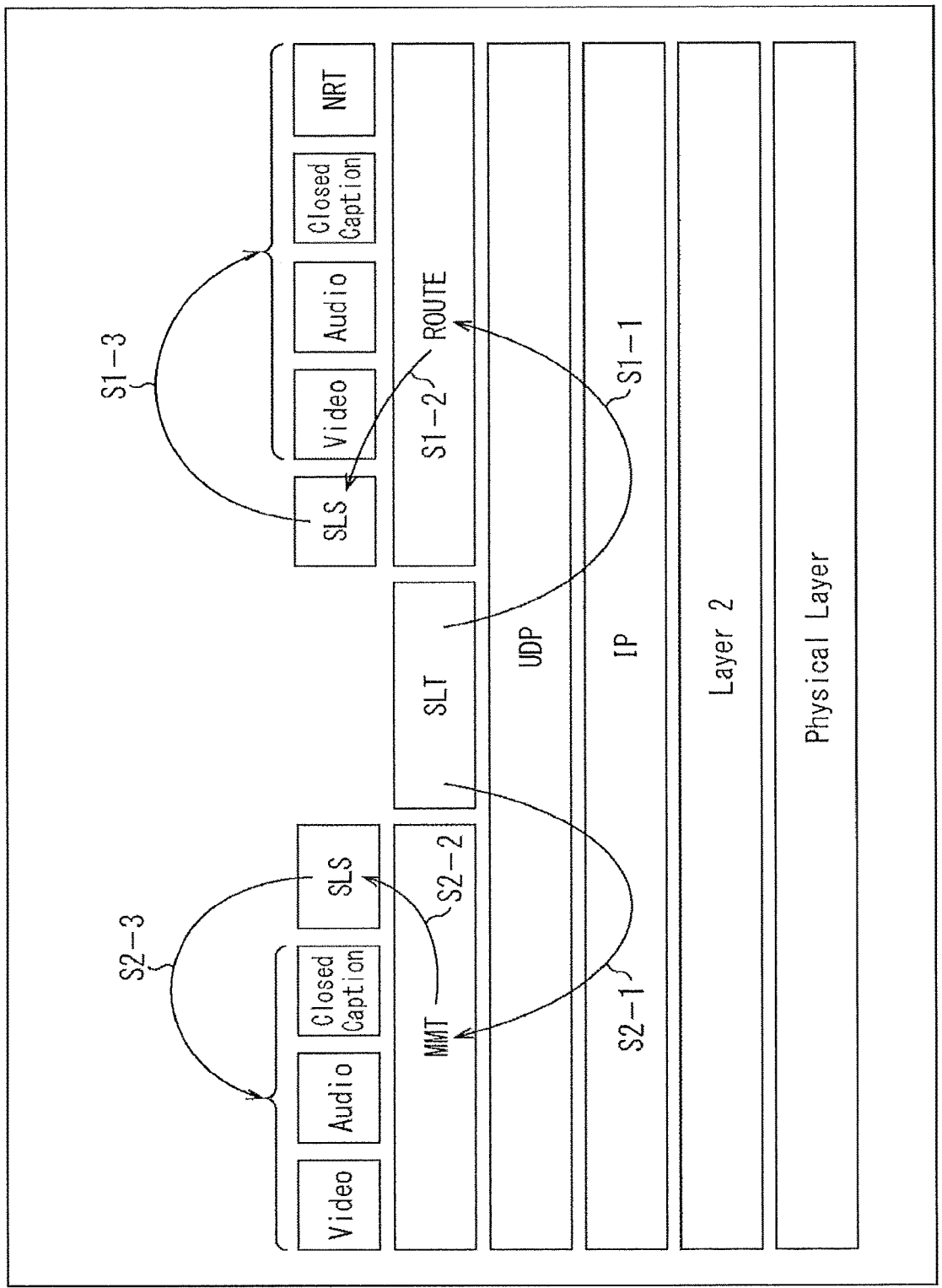
FIG. 2 is a diagram illustrating a protocol stack of an IP (Internet Protocol) transmission scheme to which the present technology is applied.

Referring to FIG. 2, there is depicted a diagram illustrating a protocol stack of the present embodiment.

As depicted in FIG. 2, the bottom layer is the physical layer. The layer adjacently over this physical layer is the layer 2 and the layer adjacently over the layer 2 is the IP layer. The layer adjacently over the IP layer is the UDP layer. That is, an IP packet (IP/UDP packet) including a UDP packet is arranged in the payload of the generic packet of the layer 2 so as to be encapsulated. A physical layer frame (ATSC physical frame) is made up of a preamble and a data part; to the data part, data is mapped that is obtained by adding an error correction parity to a BB frame obtained by encapsulating two or more generic packets and then executing such processing related with the physical layer as interleaving and mapping.

The layer adjacently over the UDP layer is made up of ROUTE, MMT, and SLT. That is, a video, audio, and subtitle stream, an SLS signaling information stream, and an NRT content stream that are transmitted in a ROUTE session are transmitted as stored in IP/UDP packets. It should be noted that NRT content is distributed by NRT (Non Real Time) broadcasting and once stored in a storage of the receiver apparatus 20 before being reproduced. A file (an application file, for example) other than that of NRT content may be transmitted in a ROUTE session.

On the other hand, a stream of video, audio, and subtitles and a stream of SLS signaling information that are transmitted in an MMT session are transmitted as stored in IP/UDP packets. SLT metadata is transmitted as stored in IP/UDP packets.

Since the protocol stack as described above is employed, the receiver apparatus 20 acquires the SLS signaling information transmitted in a ROUTE session in accordance with the station selection information included in the SLT metadata at the time of the selection of a service (a channel) provided by a component stream transmitted in the ROUTE session (S1-1, S1-2). Next, the receiver apparatus 20 connects the selected service to the component stream to be provided in accordance with the metadata such as USD, LSID, and MPD (S1-3).

Consequently, in the receiver apparatus 20, the video and audio of the content (a television program, for example) are outputted in accordance with the selected service.

Further, at the time of the selection of a service provided by component stream transmitted in an MMT session, the receiver apparatus 20 acquires SLS signaling information transmitted in the MMT session in accordance with the station selection information included in the SLT metadata (S2-1, S2-2). Then, the receiver apparatus 20 connects the selected service to a stream of components to be provided in accordance with various metadata included in the SLS signaling information (S2-3). Consequently, in the receiver apparatus 20, the video and audio of the content (a television program, for example) are outputted in accordance with the selected service.

2. Operation Related with Viewing History

Meanwhile, in the field of broadcasting, such an operation may be executed that is related with viewing history as the collection and analysis of the viewing history of content, as Usage Reporting. For such an operation, two cases are supposed: in one case, a broadcasting organization (a broadcasting station) makes researches on viewing history on services (television programs) provided by itself; in the other case, a third party organization of no concern to the broadcasting organization (an agent organization dedicated to viewing rating researches, for example) makes researches on all of the services provided by two or more broadcasting organizations.

From the viewpoint of viewing rating research companies that execute researches on viewing history, the range of viewing history researches depends on the purposes of researches; for example, various cases are supposed such as researches on all time zones of all services and researches on only the viewing situation of the content corresponding to a specific service. In addition, not only researches are done simply on only the viewing situation of the content corresponding to a service but also researches are done on user manipulation history and the like, for example. Further, viewing history analysis performance possibly depends on the functions of the receiver apparatus 20.

Still further, the receiver apparatus 20 has cases: in one case the receiver apparatus 20 has no restrictions on the log capacity for recording viewing history logs, so that a large capacity of log data can be recorded; in the other case, the receiver apparatus 20 has a limited capacity for recording viewing history logs, so that it is supposed that only a limited capacity of log data can be recorded. In the latter case, the viewing history logs of all time zones for all services cannot be recorded. Therefore, for the recording of viewing history logs, there may occur situations in which the limitation of the log scope and the log period is required.

As described above, various operation modes are supposed for the operation related with viewing history; however, since the technological schemes for executing the operation related with viewing history have not been established, proposals for executing the operation related with viewing history in a desired operation mode have been required. Therefore, in the present technology, the first scheme through the fourth scheme are proposed so as to allow the operation related with viewing history in a desired operation mode.

Viewing History Log Control Methods

Referring to FIG. 3, there is depicted a diagram for describing viewing history log control methods in the first scheme through the fourth scheme.

As depicted in FIG. 3, in the present technology, the viewing history log control methods of the four schemes, the first scheme through the fourth scheme, are defined for the operation modes in accordance with the combinations of operation types of Usage Reporting and reception environments.

Here, the operation types of Usage Reporting include a subscription UR (Usage Reporting) operation in which a viewing history researching side specifies viewing history log recording conditions (recording scope and recording period) in advance and an instant UR (Usage Reporting) operation in which a viewing history researching side specifies viewing history log transmission conditions (transmission scope and transmission period) without specifying viewing history log recording conditions.

The reception environments include direct reception in which URT metadata is received via broadcasting or via communication so as to control a viewing history log and trigger reception in which trigger information (URLR trigger information or URU trigger information) is received via broadcasting so as to control a viewing history log. It should be noted that, if content is provided by MVPD (Multichannel Video Programming Distributors) that provide paid broadcasting such as cable television (CATV) and satellite broadcasting, it is supposed that control information as signaling cannot be transmitted; however, use of trigger information allows the transmission of control information regardless of reception environments.

To begin with, the first scheme defines a viewing history log control method in an operation mode of a combination of an operation type that is subscription UR and a reception environment that is direct reception.

If this first scheme is employed, the receiver apparatus 20 acquires URT metadata via broadcasting or via communication (S11) and records a viewing history log in a log scope and a log period in accordance with this URT metadata (S12). Next, the receiver apparatus 20 uploads the viewing history log to the viewing history server 40 in an upload timing in accordance with the URT metadata (S13).

As described above, in the first scheme, the recording or the transmission of a viewing history log is controlled on the basis of the URT metadata acquired via broadcasting or via communication. It should be noted that detail contents of the first scheme will be described later with reference to FIG. 4.

Next, the second scheme defines a viewing history log control method in an operation mode of a combination of an operation type that is subscription UR and a reception environment that is trigger reception.

If this second scheme is employed, the receiver apparatus 20 acquires URLR trigger information transmitted by use of a video watermark via broadcasting (S21) and acquires URT metadata from the URT server 30 by following this URLR trigger information (S22). The receiver apparatus 20 records a viewing history log in a log scope and a log period in accordance with this URT metadata (S23). Then, the receiver apparatus 20 uploads the viewing history log to the viewing history server 40 in an upload timing in accordance with the URT metadata (S24).

As described above, in the second scheme, the recording or the transmission of a viewing history log is controlled in the basis of the URT metadata acquired via communication in accordance with the URLR trigger information acquired via broadcasting. It should be noted that details contents of the second scheme will be described later with reference to FIG. 5.

Next, the third scheme defines a viewing history log control method in an operation mode of a combination of an operation type that is instant UR and a reception environment that is direct reception.

If this third scheme is employed, the receiver apparatus 20 always records a viewing history log (S31). Next, the receiver apparatus 20 acquires URT metadata via broadcasting or via communication (S32) and uploads the recorded viewing history log to the viewing history server 40 in a log scope and a log period in accordance with this URT metadata (S33).

As described above, in the third scheme, a viewing history log is always recorded and, at the same time, the transmission of the recorded viewing history log is controlled on the basis of the URT metadata acquired via broadcasting or via communication.

Lastly, the fourth scheme defines a viewing history log control method in an operation mode of a combination of an operation type that is instant UR and a reception environment that is trigger reception.

If this fourth scheme is employed, the receiver apparatus 20 always records a viewing history log (S41). Then, the receiver apparatus 20 acquires the URU trigger information transmitted by use of a video watermark via broadcasting (S42) and uploads the recorded viewing history log to the viewing history server 40 in a log scope and a log period in accordance with the URU trigger information (S43).

As described above, the recording or the transmission of a viewing history log can be controlled by any one of the first scheme through the fourth scheme. The following describes details of the viewing history log control methods in the first scheme through the fourth scheme described above.

(1) The First Scheme: Subscription UR (Direct Reception)

Figure 4:
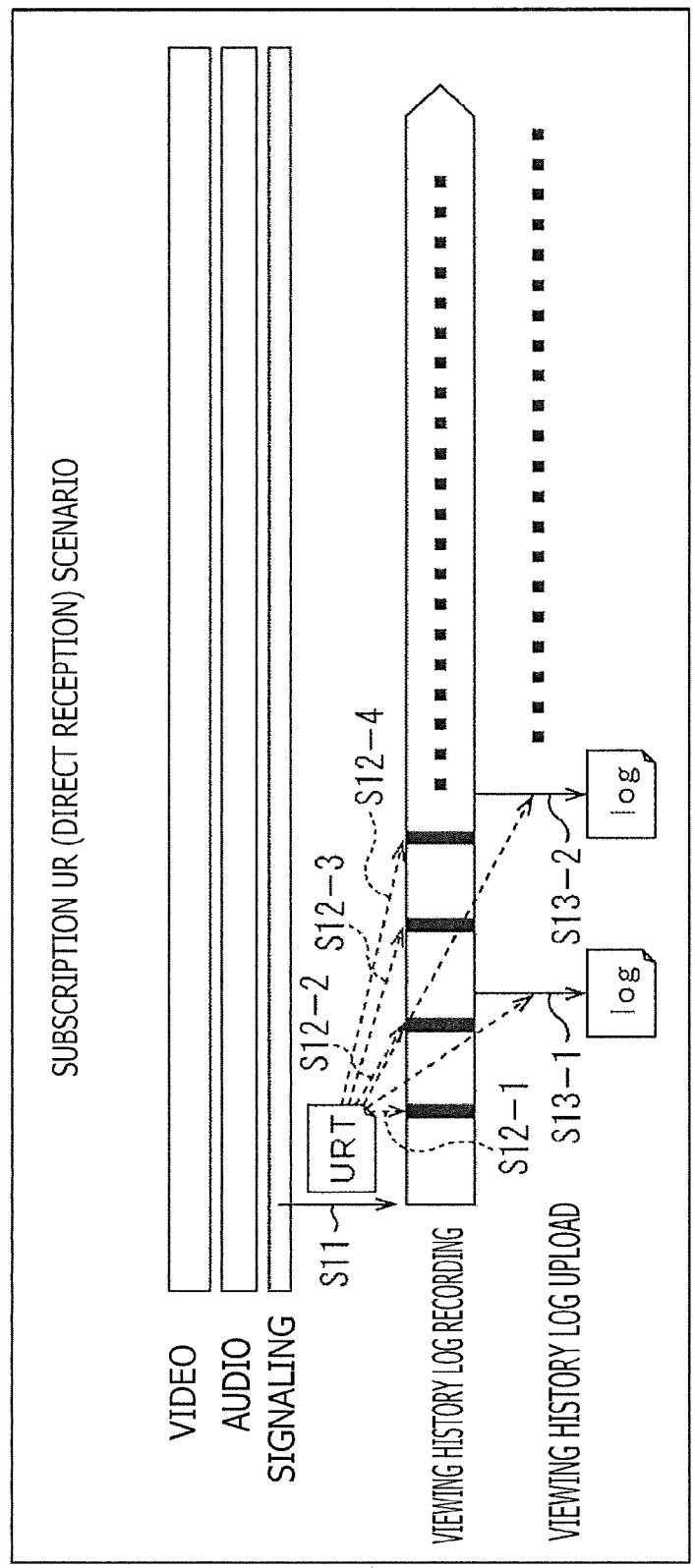
FIG. 4 is a diagram illustrating an example of a scenario of subscription UR (Usage Report) (direct reception).

Referring to FIG. 4, there is depicted a diagram illustrating an example of a scenario of subscription UR in the case where reception environment is direct reception.

In FIG. 4, a broadcast stream transmitted from the transmitter apparatus 10 and received by the receiver apparatus 20 is depicted. This broadcast stream includes video, audio, and signaling streams. The receiver apparatus 20 processes a broadcast stream so as to reproduce the content.

If the first scheme is employed, the receiver apparatus 20 receives the URT metadata transmitted from the transmitter apparatus 10 as a signaling stream (S11). It should be noted that the URT metadata may be provided from the URT server 30 via the network 90. That is, the URT metadata is acquired via broadcasting or via communication.

Next, the receiver apparatus 20 analyzes the URT metadata acquired via broadcasting or via communication so as to record the viewing history log in a log scope and a log period in accordance with URT metadata analysis results (S12).

Here, information indicative of an item (a detail degree of a log) of a viewing history log to be recorded is specified as a log scope and information indicative of a time zone in which a viewing history log is recorded is specified as a log period, for example, so that, every time the time zone indicated by the log period comes, the receiver apparatus 20 records the viewing history log (a CDM file) in accordance with an item (a detail degree of a log) indicated by the log scope (S12-1, S12-2, S12-3, S12-4, . . . ).

Then, in accordance with the URL (hereafter referred to as a viewing history server URL) of the viewing history server 40, the receiver apparatus 20 uploads the viewing history log recorded in accordance with a log scope and a log period to the viewing history server 40 via the network 90 in an upload timing in accordance with the URT metadata analysis results (S13). It should be noted that, since the URT metadata includes a viewing history server URL as destination information, the viewing history server URL is acquired from the URT metadata.

Here, information indicative of a time zone in which a viewing history log is uploaded to the viewing history server 40 is specified as an upload timing, for example, so that, every time the time zone indicated by the upload timing comes, the receiver apparatus 20 uploads the viewing history log (the CDM file) recorded in accordance with a log scope and a log period to the viewing history server 40 (S13-1, S13-2, . . . ).

Consequently, the viewing history server 40 can collect viewing history logs (CDM files) uploaded from two or more receiver apparatuses 20 via the network 90 so as to execute analyses (viewing rating researches, for example).

As described above, in the first scheme, if there are limitations on a log capacity for recording viewing history logs in the receiver apparatus 20 and therefore only a limited capacity of log data can be recorded, for example, then the viewing history log in accordance with items (a log scope and a log period) specified by the broadcasting station side is recorded by following the URT metadata acquired via broadcasting or via communication and, at the same time, the viewing history log is regularly uploaded to the viewing history server 40 with a timing (an upload timing) specified by the broadcasting side.

(2) The Second Scheme: Subscription UR (Trigger Reception)

Figure 5:
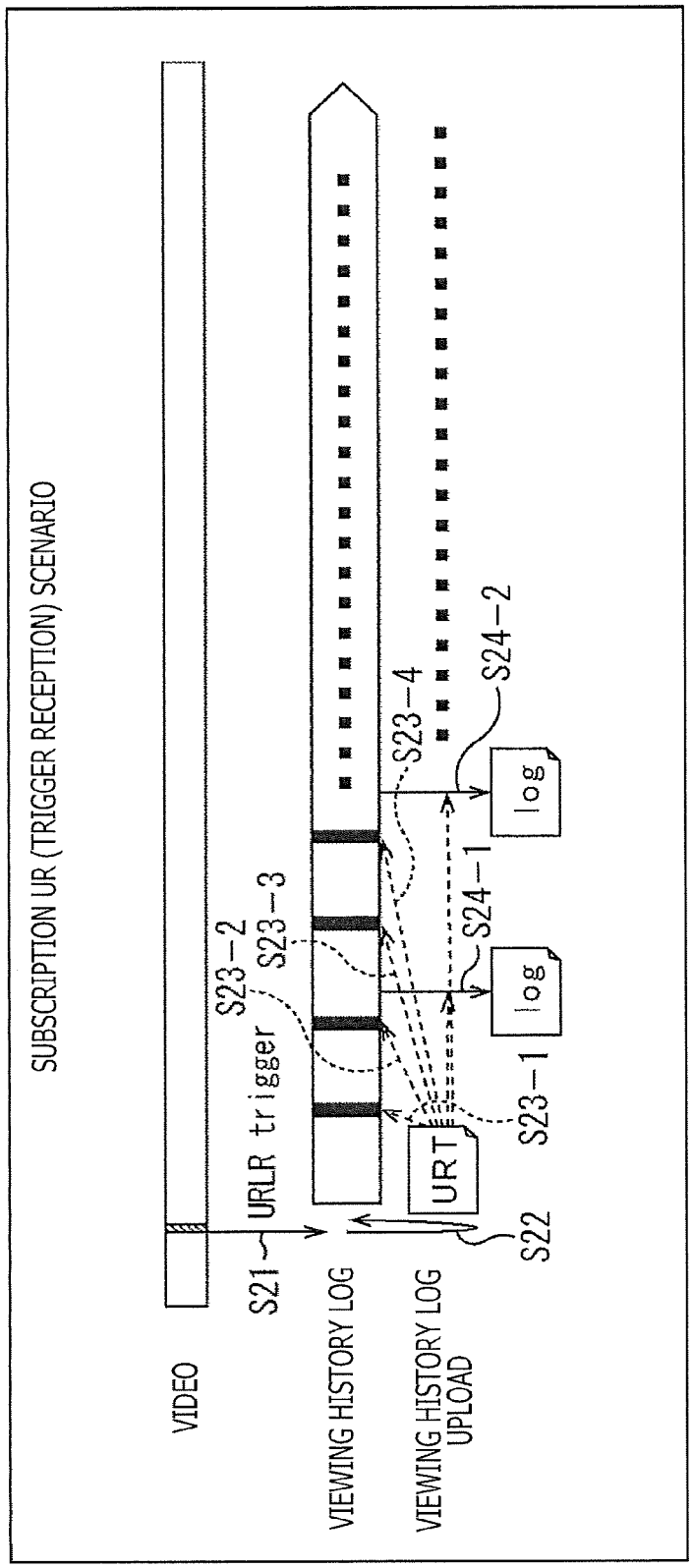
FIG. 5 is a diagram illustrating an example of a scenario of subscription UR (trigger reception).

Referring to FIG. 5, there is depicted a diagram illustrating an example of a scenario of subscription UR in the case where reception environment is trigger reception.

In FIG. 5, a broadcast stream transmitted from the transmitter apparatus 10 and received by the receiver apparatus 20 is illustrated. With this broadcast stream, only a video stream that includes URLR trigger information is especially illustrated. The receiver apparatus 20 processes a broadcast stream so as to reproduce the content.

Here, if the second scheme is employed, the receiver apparatus 20 receives URLR trigger information included in a video stream from the transmitter apparatus (S21). It should be noted that, in this example, the URLR trigger information is transmitted by use of a video watermark; however, it is also practicable to transmit the URLR trigger information in another method such as use of an audio watermark or an audio user data, for example.

Next, the receiver apparatus 20 analyzes the URLR trigger information acquired via broadcasting, accesses the URT server 30 via the network 90 by following URLR trigger information analysis results, and acquires URT metadata (S22). It should be noted that, since the URL (hereafter referred to as the URT server URL) of the URT server 30 is included in the URLR trigger information as destination information, the URT server URL is acquired from the URLR trigger information.

Next, the receiver apparatus 20 analyzes the URT metadata acquired via communication so as to record the viewing history log in a log scope and a log period in accordance with URT metadata analysis results (S23).

Here, information indicative of an item (detail degree of a log) of a viewing history log to be recorded is specified as a log scope and information indicative of a time zone in which the viewing history log is recorded is specified as a log period, so that, for example, every time a time zone indicated by the log period comes, the receiver apparatus 20 records the viewing history log (the CDM file) in accordance with the content (detail degree of a log) indicated by the log scope (S23-1, S23-2, S23-3, S23-4, . . . ).

Then, the receiver apparatus 20 uploads the viewing history log recorded in accordance with a log scope and a log period to the viewing history server 40 via the network 90 in an upload timing in accordance with URT metadata analysis results by following the viewing history log server URL (S24). It should be noted that the viewing history server URL is acquired from the URT metadata.

Here, information indicative of a time zone in which a viewing history log is uploaded to the viewing history server 40 is specified as an upload timing, for example, so that every time the time zone indicated by the upload timing comes, the receiver apparatus 20 uploads the viewing history log (the CDM file) recorded in accordance with a log scope and a log period to the viewing history server 40 (S24-1, S24-2, . . . ).

Consequently, the viewing history server 40 can collect viewing history logs (CDM files) uploaded from two or more receiver apparatuses 20 via the network 90 so as to execute analyses (viewing rating researches, for example).

As described above, in the second scheme, if there are limitations on a log capacity for recording viewing history logs in the receiver apparatus 20 and therefore only a limited capacity of log data can be recorded, for example, then the viewing history log in accordance with items (a log scope and a log period) specified by the broadcasting station side is recorded by following the URT metadata acquired in accordance with URLR trigger information via communication and, at the same time, the viewing history log is regularly uploaded to the viewing history server 40 with a timing (an upload timing) specified by the broadcasting side.

(3) The Third Scheme: Instant UR (Direct Reception)

Figure 6:
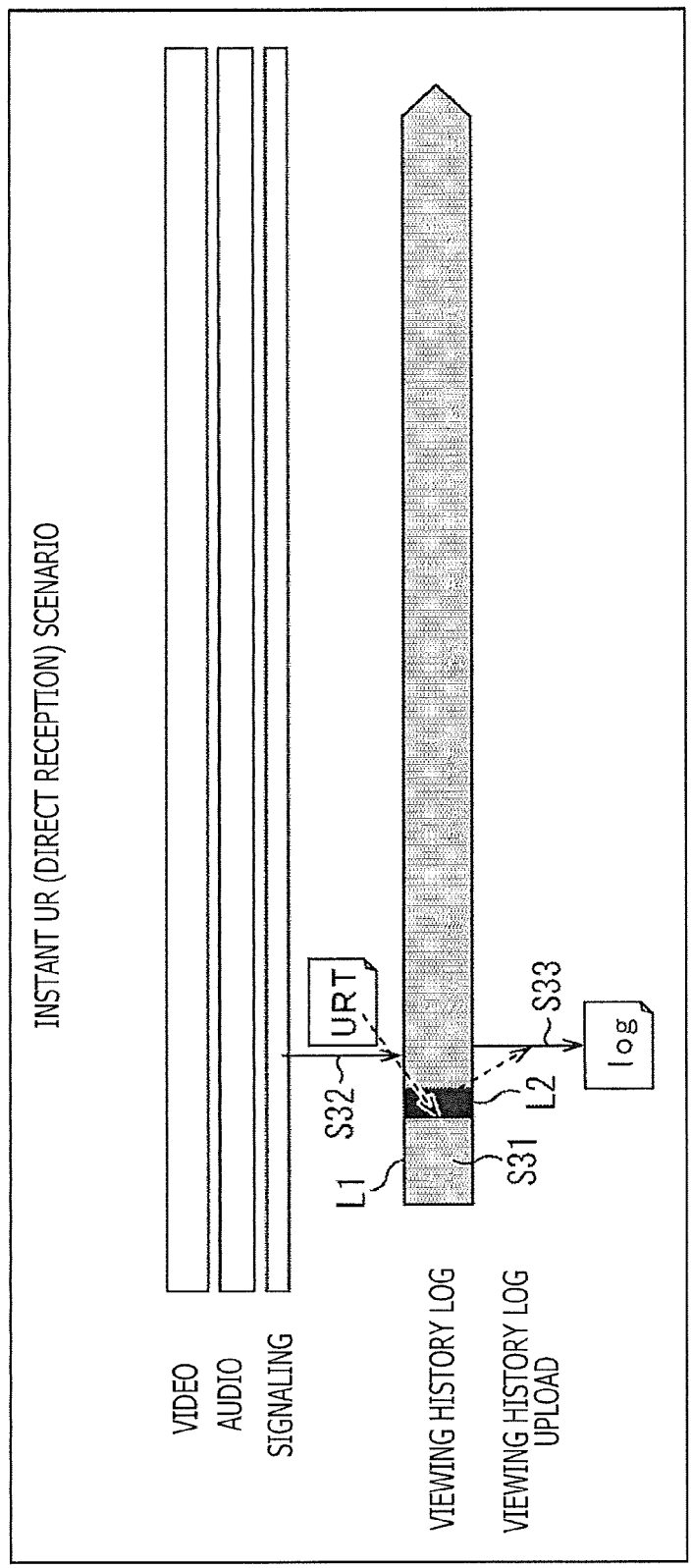
FIG. 6 is a diagram illustrating an example of a scenario of instant UR (direct reception).

Referring to FIG. 6, there is depicted a diagram illustrating an example of a scenario of instant UR in the case where reception environment is direct reception.

In FIG. 6, a broadcast stream transmitted from the transmitter apparatus 10 and received by the receiver apparatus 20 is illustrated. The receiver apparatus 20 processes a broadcast stream so as to reproduce the content.

Here, if the third scheme is employed, the receiver apparatus 20 always records a viewing history log (a CDM file) of a given item at the time of reproducing the content of all services as product functions, for example, (S31). It should be noted that, in FIG. 6, that a viewing history log is always recorded is expressed by a viewing history log L1.

Next, the receiver apparatus 20 receives URT metadata transmitted as a steam of signaling from the transmitter apparatus 10 (S32). It should be noted that the URT metadata may be provided from the URT server 30 via the network 90. That is, in the third scheme too, URT metadata is acquired is acquired via broadcasting or via communication as with the first scheme.

Then, the receiver apparatus 20 analyzes the URT metadata acquired via broadcasting or via communication so as to (retrospectively) extract, from among the always recorded viewing history logs, the viewing history log corresponding to the log scope and the log period in accordance with the URT metadata analysis results (S33). The receiver apparatus 20 uploads the (retrospectively) extracted viewing history log to the viewing history server 40 via the network 90 in accordance with the viewing history server URL (S33).

Here, in the receiver apparatus 20, of the always recorded viewing history log L1 (expressed by gray in the diagram) at the time of the reception of the URT metadata, the viewing history log L2 (expressed by black in the diagram) corresponding to the log scope and the log period in accordance with the URT metadata analysis results, for example, is retrospectively extracted so as to be uploaded to the viewing history server 40.

Consequently, the viewing history server 40 can collect viewing history logs (CDM files) uploaded from two or more receiver apparatuses 20 via the network 90 so as to execute analyses (viewing rating researches, for example).

As described above, in the third scheme, if there is no limitation on the log capacity for recording viewing history logs and therefore a large capacity of log data can be recorded, for example, in the receiver apparatus 20, then a given item of a viewing history log is always recorded and, by following the URT metadata acquired via broadcasting or via communication, a viewing history log in accordance with items (a log scope and a log period) specified by the broadcasting station side from among the always recorded viewing history logs is uploaded to the viewing history server 40.

(4) The Fourth Scheme: Instant UR (Trigger Reception)

Figure 7:
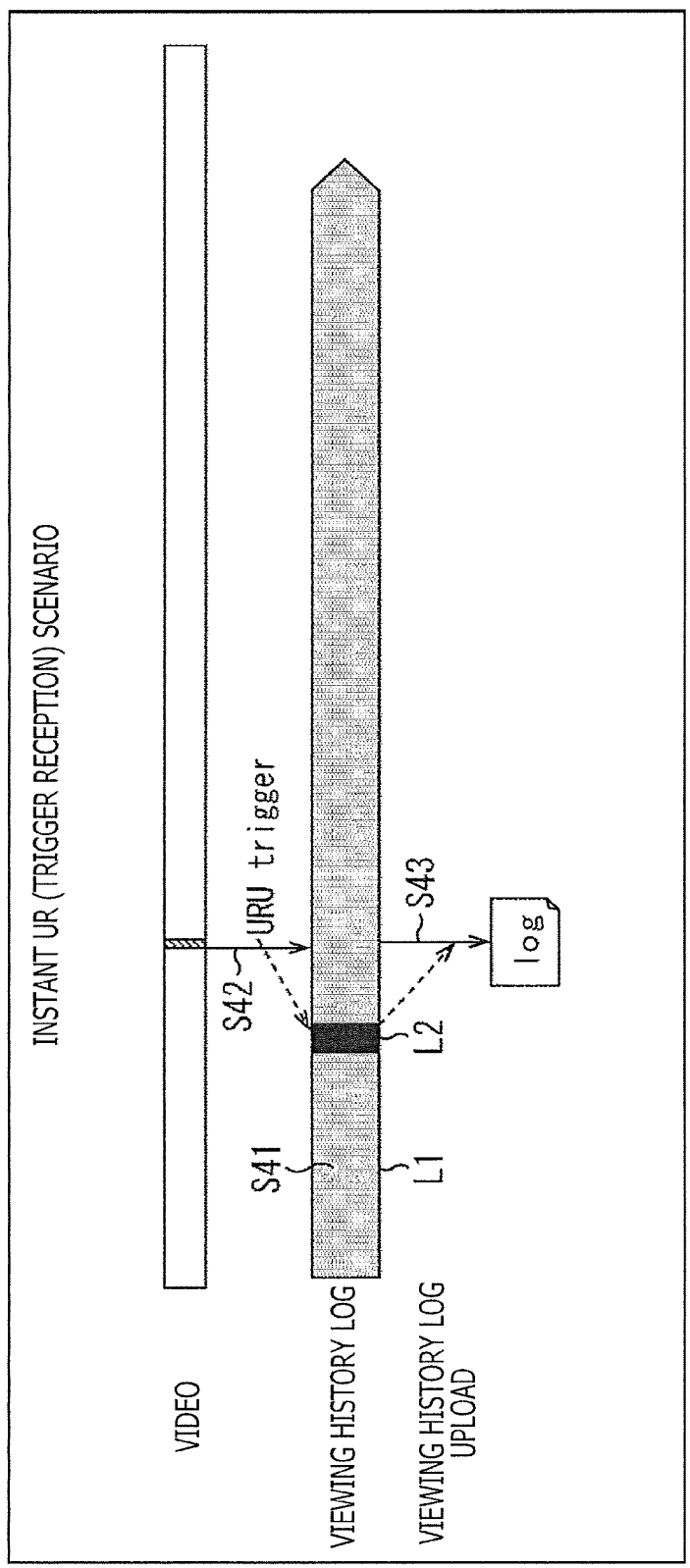
FIG. 7 is a diagram illustrating an example of a scenario of instant UR (trigger reception).

Referring to FIG. 7, there is depicted a diagram illustrating an example of a scenario of instant UR in the case where reception environment is trigger reception.

In FIG. 7, a broadcast stream transmitted from the transmitter apparatus 10 and received by the receiver apparatus 20 is illustrated. In this broadcast stream, only a video stream that includes URU trigger information is especially illustrated. The receiver apparatus 20 processes the broadcast stream so as to reproduce the content.

Here, if the fourth scheme is employed, then the receiver apparatus 20 always records a given item of a viewing history log (a CDM file) at the time of reproducing the content of all services (S41). It should be noted that, in FIG. 7 too, that a viewing history log is always recorded in the receiver apparatus 20 is expressed by a viewing history log L1 as with FIG. 6.

Next, the receiver apparatus 20 receives the URU trigger information included in the video stream from the transmitter apparatus 10 (S42). It should be noted that URU trigger information is transmitted by use of a video watermark; however, it is also practicable to transmit URU trigger information in another method such as use of an audio watermark or an audio user data.

Then, the receiver apparatus 20 analyzes the URU trigger information acquired via broadcasting so as to (retrospectively) extract, from among the always recorded viewing history logs, the viewing history log corresponding to the log scope and the log period in accordance with the URU trigger information analysis results (S43). The receiver apparatus 20 uploads the (retrospectively) extracted viewing history log to the viewing history server 40 via the network 90 in accordance with the viewing history server URL (S43).

Here, in the receiver apparatus 20, of the always recorded viewing history logs L1 (expressed by gray in the diagram) at the time of the reception of the URU trigger information, a viewing history log L2 (expressed by black in the diagram) corresponding to the log scope and the log period in accordance with the URU trigger information analysis results, for example, is retrospectively extracted (cut out) so as to be uploaded to the viewing history server 40.

Consequently, the viewing history server 40 can collect viewing history logs (CDM files) uploaded from two or more receiver apparatuses 20 via the network 90 so as to execute analyses (viewing rating researches, for example).

As described above, in the fourth scheme, if there is no limitation on the log capacity for recording viewing history logs and therefore a large capacity of log data can be recorded, for example, in the receiver apparatus 20, then a given item of a viewing history log is always recorded and, by following the URU trigger information acquired via broadcasting, a viewing history log in accordance with items (a log scope and a log period) specified by the broadcasting station side from among the always recorded viewing history logs is uploaded to the viewing history server 40.

3. Detail Specifications of Each Piece of Data Used in an Operation Related with Viewing History (1) URT Metadata Structure Overview of URT Referring to FIG. 8, there is depicted a diagram for describing an overview of URT (Usage Report Table) metadata.

URT metadata includes one or more pieces of unit UR (Usage Reporting) information for each service. As depicted in FIG. 8, in URT metadata, unit UR information is specified with log scope, log period, and upload timing as main items. Further, an upload group is specified with information necessary for uploading viewing history logs in units of groups.

A log scope is specified with items to be recorded as a viewing history log. For items to be recorded as a viewing history log, a log scope can include "basic," "component," "record," and "application ("app")." However, of these pieces of log scope information, "basic" is an essential item but the other items "component," "record," and "application" are optional.

"Basic" provides basic information indicative whether content has been viewed or not. "Component" provides information (component information) about a component such as which component has been viewed for each video or audio if there are two or more components.

"Record" provides information (video recording information) related with recording such as whether recorded content has been viewed or not if content recording took place. "Application ("app")" provides, if there are applications cooperatively linked to content, information (application information) indicative which application has been executed.

A log period is specified with a period in which a viewing history log is recorded. A log period can include periodic information "periodic" and period information "period" as a period for recording the viewing history log.

For periodic information "periodic" of log period, "one-time," "everyday," "every week," or "every month," for example, can be specified as an interval to be specified as period information. In addition, for "period," a start time and an end time of recording a viewing history log are specified.

For "upload timing," a timing of uploading a viewing history log and upload destination information are specified for each upload group ID. The upload destination information is specified with a viewing history server URL.

Further, the viewing history log uploading timing can include periodic information "periodic" and period information "period."

For the periodic information "periodic" of an upload timing, whether the period to be specified as period information "period" is "one-time" or repetition of "everyday," "every week," or "every month" can be specified. For period information "period," a start time and an end time of uploading a viewing history log are specified.

Further, an upload timing can be specified with a diffusion parameter "diffusion" for dispersing viewing history log upload timings in order to prevent many receiver apparatuses 20 from accessing the viewing history server 40 all at once (namely, access concentration).

Here, in the description with reference to FIG. 8, the URT metadata with the operation type of Usage Reporting being subscription UR, namely, the URT metadata used in the first scheme or the second scheme is presumed and the receiver apparatus 20 records a viewing history log with a log scope and a log period (a recording scope and a recording period) of the viewing history log specified in the URT metadata concerned.

On the other hand, in the case of URT metadata with the operation type of Usage Reporting being instant UR, namely, the URT metadata used in the third scheme, the receiver apparatus 20 (retrospectively) extracts, from among the always recorded viewing history logs, the viewing history log corresponding to the log scope and the log period (the transmission scope and the transmission period) specified in the URT metadata concerned and uploads the extracted viewing history log to the viewing history server 40. It should be noted that, in the fourth scheme, a log scope and a log period (a transmission scope and a transmission period) specified in URU trigger information are used instead of URT metadata.

It should be noted that, in FIG. 8, an upload group is defined so as to depict an example in which viewing history logs are uploaded in units of groups; however, it is also practicable to upload viewing history logs to the viewing history server 40 in units of logs of view history logs without using the upload group.

URT Syntax

Referring to FIG. 9, there is depicted a diagram illustrating a syntax of URT (Usage Report Table) metadata of XML format. It should be noted that, in FIG. 9, of an element and an attribute, an attribute is attached with "@." An indented element and an indented attribute are specified for the higher element. These relationships also hold true with FIG. 10 to be described later.

An URT element as a root element is the higher element a ServiceLog element and an Upload:group element. A ServiceLog element includes one or more pieces of unit UR information for each service. A ServiceLog element is the higher element of a BroadcastStreadId attribute, ServiceID attribute, and LogUnit element.

A BroadcastStreamId attribute is specified with a broadcast stream ID. A ServiceId attribute is specified is an Service ID. That is, a target service is identified by a broadcast stream Id and a service ID.

A LogUnt element is the higher element of a group attribute, a scope element, and a period element. A group attribute is specified with an upload group ID for identifying an upload group.

A scope element is specified with items to be recorded (transmitted) as a viewing history log. A scope element is the higher element of a "basic" attribute, a "comp" attribute, a "rec" attribute, and an "app" attribute. A "basic" attribute is specified with a flag indicative of whether basic information is an item to be recorded (transmitted) as a viewing history log. A "comp" attribute is specified with a flag indicative of whether component information is an item to be recorded (transmitted) as a viewing history log.

A "rec" attribute is specified with a flag indicative of whether video recording information is an item to be recorded (transmitted) as a viewing history log. An "app" attribute is specified with a flag indicative of whether application information is an item to be recorded (transmitted) as a viewing history log. It should be noted that, in a scope element, a "basic" attribute is an essential attribute but a "comp" attribute, a "rec" attribute, and an "app" attribute are optional attributes.

A period element is specified with a period in which a viewing history log is recorded (transmitted). A period element is the higher element of a periodic attribute, a begin attribute, and end attribute. A periodic attribute can be specified with periodic information indicative of the case in which a period specified as period information (recording period or transmission period) is only once (one-time) or the repetition of "hourly," "daily," "weekly," or "monthly."

A begin attribute is specified with a log start time of a viewing history log. An end attribute is specified with a log end time of a viewing history log. That is, the period information (a recording period or a transmission period) made up of a start time and an end time for recording (transmitting) a viewing history log is specified by a begin attribute and an end attribute of a period element.

An Upload:group element is specified upload timing and upload destination information of viewing history log for each upload group ID as information related with upload timing. An Upload:group element provides the higher element of an "id" attribute, a "uri" attribute, a "periodic" attribute, a "begin" attribute, an "end" attribute, and a "diffusion" attribute.

An "id" attribute is specified with an upload group ID for identifying an upload group. A "uri" attribute is specified with a viewing history log server URL. A "periodic" attribute can be specified with periodic information indicative of the case in which a period specified as period information (upload timing) is only once (one-time) or the repetition such as "hourly," "weekly," or "monthly."

A "begin" attribute is specified with a start time of an upload timing of a viewing history log. An "end" attribute is specified with an end time of an upload timing of a viewing history log. That is, period information (an upload timing) made up of a start time and an end time for uploading a viewing history log is specified by a "begin" attribute and an "end" attribute of an Upload:group element.

A "diffusion" attribute is specified with a diffusion parameter for dispersing viewing history log upload timings.

It should be noted that, in FIG. 9, if "1" is specified in appearance count (Cardinality), only one element or attribute concerned is always specified and, if "0 . . . 1" is specified, whether the element or the attribute concerned is to be specified or not is optional. If "1 . . . n" is specified, one or more elements or attributes concerned are specified and, if "0 . . . n" is specified, whether or not the element or the attribute concerned is to be specified one or more is optional. There relationships also hold true with a syntax of CDM depicted in FIG. 10 to be described below.

(2) CDM Structure
CDM Syntax

Referring to FIG. 10, there is depicted a diagram illustrating an example of a syntax of CDM (Consumption Data Message) of XML format, one example of a viewing history log.

In FIG. 10, a CDM element as a root element provides the higher element of a protocolVersion attribute and an AVChannel element. A protocolVersion attribute is specified with a CDM protocol version.

An AVChannel element is specified with information related with the viewing history of every service (channel). An AVChannel element provides the higher element of a BroadcastStreamId attribute, ServiceId attribute, and a ViewInterval element. A BroadcastStreamId attribute is specified with an broadcast stream ID. A ServiceId attribute is specified with a service ID. That is, a target service is identified by a broadcast stream ID and a service ID.

A ViewInterval element provides the higher element of a startTime attribute, an endTime attribute, a presentRecord attribute, a viewStartTime attribute, a viewEndTime attribute, a DOinterval element, and a Component element.

The viewing start time and the viewing end time of the content corresponding to a target service are specified by a startTime attribute and an endTime attribute within a log period. That is, whether the content has been viewed or not is recorded by this period.

A presentRecord attribute is specified with a viewing mode. For example, if "p(present)" is specified, it denotes that content is viewed at the time of on-air without recording the content. I "r(record)" is specified, it denotes that recorded content is viewed. If "p+r(present+record)" is specified, content is viewed at the time of on-air and also after recording the content.

If "r(record)" or "p+r(present+record)" is specified by a viewStartTime attribute and a viewEndTime attribute as a presentRecord attribute, then the viewing start time and the viewing end time of the recorded content are specified.

A DOinterval element is specified with information related with an application. A DOinterval element provides the higher element of an AppId element, a startTime attribute, and an endTime attribute. An AppId element is specified with an application ID for identifying an application. An execution start time and an execution end time of a target application are specified by a startTime attribute and an endTime attribute.

A Component element is specified with information related with a component. A Component element provides the higher element of a componentId attribute, a pathType attribute, a startTime attribute, and an end Time attribute. A componentId attribute is specified with an component ID for identifying a component. A pathType attribute is specified with a path of a target component, namely, via broadcasting or via communication. A viewing start time and a viewing end time of a target component are specified by a startTime attribute and an endTime attribute.

Here, in FIG. 10, items "basic," "+rec," "+comp," and "+app" correspond to "basic," "component," "record," and "app" included in the URT metadata depicted in FIG. 8 and FIG. 9. Further, in FIG. 10, for each of items "basic," "+rec," "+comp," and "+app," "O" is entered for CDM elements and attributes or any of the items are left blank; if "O" is entered, it denotes that the entered item is recorded (transmitted) as a viewing history log (CDM) in accordance with a target log scope.

That is, if "basic" is specified in URT metadata, then basic information specified by a protocolVersion attribute, a BroadcastStreamId attribute and a ServiceId attribute of an AVChannel element, and a startTime attribute and an endTime attribute of a ViewInterval element is recorded (transmitted) as a viewing history log (a CDM file). However, in a log scope, "basic" is an essential time, so that these pieces of basic information are always recorded (transmitted) as a viewing history log (a CDM file).

If "record" is specified in URT metadata, video recording information specified by a presentRecord attribute, a viewStartTime attribute, and a viewEndTime attribute of a ViewInterval element is recorded (transmitted) as a viewing history log (a CDM file). However, in a log scope, "record" is an optional item.

In addition, if application "app" is specified in URT metadata, application information specified by an AppId element, a startTime attribute, and an endTime attribute of a DOinterval element is recorded (transmitted) as a viewing history log (a CDM file). However, in a log scope, "application (app)" is an optional item.

Further, if "component" is specified in URT metadata, component information specified by a componentId attribute, a pathType attribute, a startTime attribute, and an endTime attribute of a Component element is recorded (transmitted) as a viewing history log (a CDM file). However, in a log scope, "component" is an optional item.

It should be noted that the elements and attributes depicted in the syntax of CDM depicted in FIG. 10 are illustrative only and therefore other elements and attributes may be included in log scope items such as "basic" and "record." Further, "basic," "record," "application (app)," and "component" are one example of the classification (items) of a log scope and therefore other items may be defined.

(3) Trigger Information Structure

Referring to FIG. 11, there is depicted a diagram for describing an overview of control by use of trigger information.

In a control operation based on trigger information, a video watermark is used in a video stream included in a broadcast stream, for example, so as to transmit trigger information for providing various functions. Consequently, in the receiver apparatus 20, the processing operations in accordance with various functions are executed on the basis of this trigger information.

In FIG. 11, if the receiver apparatus 20 receives trigger information (application trigger information) for providing functions related with an application, the receiver apparatus 20 can control an operation of an application to be executed as linked with content by acquiring AIT on the basis of this application trigger information. It should be noted that AIT (Application Information Table) is application control information that is acquired from a server or the like on the network 90.

Further, if the receiver apparatus 20 receives trigger information (SLS trigger information) for providing functions related with SLS signaling information, the receiver apparatus 20 can adaptively output video data or audio data (alternative components) making up the content to be obtained via communication by acquiring MPD metadata on the basis of this SLS trigger information, for example.

If the receiver apparatus 20 receives trigger information (subtitle trigger information) for providing functions related with subtitles, the receiver apparatus 20 can control the subtitles to be displayed on content in a superimposed manner by acquiring subtitle information such as SIT on the basis of the subtitle trigger information. It should be noted that SIT (Subtitle Information Table) is control information for controlling subtitles.

In addition, if the receiver apparatus 20 receives trigger information (ESG trigger information) for providing functions related with an electronic program table, the receiver apparatus 20 can execute the processing related with the electronic program table by acquiring ESG information on the basis of this ESG trigger information.

Further, if the receiver apparatus 20 receives trigger information (EAD trigger information) for providing functions related with emergency notification services, the receiver apparatus 20 can execute the processing related with the emergency notification services by acquiring EAD information on the basis of this EAD trigger information.

Here, in executing an operation related with viewing history, upon reception of URLR trigger information, the receiver apparatus 20 records a viewing history log (a CDM file) in a log scope and a log period following URT metadata analysis results by acquiring URT metadata from the URT server 30 via the network 90 on the basis of this URLR trigger information.

Then, the receiver apparatus 20 uploads the recorded viewing history log (CDM file) to the viewing history server URL via the network 90 with an upload timing following the URT metadata analysis results. That is, in this case, the operation mode of the second scheme is realized as an operation related with viewing history.

In executing an operation related with viewing history, upon reception of URU trigger information, the receiver apparatus 20 analyzes this URU trigger information(retrospectively) extracts, from among always recorded viewing history logs, the viewing history log corresponding to the log scope and the log period in accordance with the URU trigger information analysis results Next, the receiver apparatus 20 uploads the (retrospectively) extracted viewing history log to the viewing history server 40 via the network 90 by following the viewing history server URL. That is, in the case, the operation mode of the fourth scheme is realized as an operation related with viewing history.

It should be noted that, if the receiver apparatus 20 acquires trigger information (TLT trigger information) for acquiring TLT (Trigger List Table), the receiver apparatus 20 can acquire trigger information after recognizing which trigger information is being transmitted at the current point of time by acquiring the TLT information on the basis of this TLT trigger information. It should be noted that TLT is a trigger channel list indicative of a list of trigger information to be transmitted for each channel (trigger channel).

Trigger Information Syntax

Referring to FIG. 12, there is depicted a diagram illustrating an example of a trigger information syntax.

Trigger information has a structure in which a command ID ("cmdID") that is type information indicative of a type of trigger information, a trigger channel ID for identifying a trigger channel along which trigger information is transmitted, and a URI (Uniform Resource Identifier) as location information that is a trigger information body are written.

In FIG. 12, a 4-bit number of trigger is specified with the number of pieces of trigger information N (N being an integer 1 or higher) indicative of the number of triggers. A 4-bit trigger_map_number is specified with the number of trigger maps M (M being an integer 1 or higher) indicative of the number of maps of trigger information. A 1-bit trigger_name_flag is specified with a flag indicative whether a name of trigger information is to be arranged or not.

A first loop of the number of triggers N is arranged with "channelID," "cmdID," "version," "length," and "name_length" for each piece of trigger information. An 8-bit "channelID" is specified with a trigger ID. Here, a trigger channel is indicative of a series for each function provided by trigger information and is identified by a trigger channel ID.

An 8-bit "cmdID" is specified with a command ID. A command ID is type information indicative of a type (a kind) of trigger information. It should be noted that details of a command ID will be described later with reference to FIG. 13. An 8-bit "version" is specified with version information for each trigger channel. An 8-bit "length" is specified with the number of trigger information bytes.

If "trigger_name_flag" is "1," then the length of the name of trigger information is specified by an 8-bit "name_length," the loop thereof being arranged with an 8-bit "trigger_name_byte." A "trigger_name_byte" is specified with a name of trigger information.

A loop of the number of trigger maps M is arranged with a 16-bit "trigger_map_bits." A "trigger_map_bits" is a bit map indicative of a type of the trigger currently being transmitted by each bit.

A second loop of the number of triggers N is arranged with an 8-bit "URI_byte" for each piece of trigger information. "URI_byte" is specified with URI as a trigger body.

Types of Trigger Information

Referring to FIG. 13, there is depicted a diagram illustrating types of trigger information in accordance with command IDs.

In FIG. 13, command ID "0" is indicative of TLT trigger information and, for the URI thereof, the URL of a TLT server for providing TLT information is specified. Command ID "1" is indicative of application trigger information and, for the URI thereof, the URL of an AIT server for providing AIT is specified. Command ID "2" is indicative of trigger information for directly controlling an application and, for the URI thereof, the URL of an application server for providing applications is specified, for example.

Command ID "3" is indicative of SLS trigger information and, for the URI thereof, the URL of an SLS server for providing SLS (MPD metadata, for example) is specified. Command ID "4" is indicative of subtitle trigger information and, for the URI thereof, the URL of a subtitle server for providing subtitle information is specified. Command ID "5" is indicative of ESG trigger information and, for the URI thereof, the URL of an ESG server for providing ESG information is specified.

Command ID "6" is indicative of EAD trigger information and, for the URI thereof, the URL of an EAD server for providing EAD is specified. Command ID "7" is indicative of RRT trigger information and, for the URI thereof, the URL of an RRT server for providing RRT is specified. Command ID "8" is indicative of trigger information corresponding to PDI (Preference Demographic and Interest) and, for the URI thereof, the URL of a PDI server for providing PDI is specified. It should be noted that PDI is a mechanism in which only the content matching user preference is reproduced (accumulated) by generating information indicative of user replies to inquiries from a provider server.

Command ID "9" is indicative of URLR trigger information and, for the URI thereof, the URL (URT server URL) of the URT server 30 is specified. Command ID "10" is indicative of URU trigger information and, for the URI thereof, the URL (viewing history server URL) of the viewing history server 40 is specified.

Format of URLR Trigger Information

Referring to FIG. 14, there is depicted a diagram illustrating an example of the format of URLR trigger information.

In FIG. 14, URLR trigger information has a structure in which header information such as channel ID, command ID, and version information, and location information ("locator part") that is a trigger information body as URI are written.

A channel ID is specified with an ID for identifying a trigger channel along which the URLR trigger information concerned is transmitted. A command ID is specified with "9" in the case of URLR trigger information. Location information is specified with the URL (the URT server URL) of the URT server 30 that provides URT metadata.

A "terms" is specified with diffusion information ("diffusion") is specified. Diffusion information is specified with information for statistically diffusing the accesses to the URT server 30 when two or more receiver apparatus 20 request the URT server 30 for URT metadata.

URU Trigger Information Format

Referring to FIG. 15, there is depicted a diagram illustrating an example of a format of URU trigger information.

In FIG. 15, URU trigger information has a structure in which header information such as a channel ID, a command ID, and version information, and location information ("locator part") that is a trigger information body as URI are written.

A channel ID is specified with an ID for identifying a trigger channel along which trigger information concerned is transmitted. A command ID is specified with "10" in the case of URU trigger information. Location information is specified with the URL (the viewing history server URL) of the viewing history server 40 that uploads an always recorded viewing history log (a CDM file).

A "terms" is specified with a log period and a log scope (a transmission period and a transmission scope) of an upload target, and diffusion information ("diffusion").

This log period ("target period") is specified with a transmission period of a viewing history log. For example, here, a log start time of a viewing history log represented by "1*10 hex digit" is specified as "b=" and a log end time of the viewing history log represented by "1*10 hex digit" is specified as "e=," so that, in the receiver apparatus 20, the viewing history log corresponding to the period information (transmission period) consisting of these log start time and log end time is extracted (cut out) from among the always recorded viewing history logs.

A log scope ("scope") is specified with a transmission scope of a viewing history log. For example, here, basic information ("basic") is an essential item as an item to be transmitted as a viewing history log and component information ("comp"), video recording information ("rec"), and application information ("app") are optional items.

Diffusion information is specified with information for statistically diffusing the accesses to the viewing history server 40 when two or more receiver apparatuses 20 upload viewing history logs (CDM files) to the viewing history server 40.

4. Apparatus Configurations

The following describes detail configurations of the apparatuses making up the transmission system 1 depicted in FIG. 1 with reference to FIG. 16 through FIG. 19. In what follows, the configurations of the transmitter apparatus 10, the receiver apparatus 20, and the viewing history server 40 will be described in this order.

An Example of Configuration of Transmitter Apparatus

Referring to FIG. 16, there is depicted a diagram illustrating an example of a configuration of the transmitter apparatus 10 depicted in FIG. 1.

In FIG. 16, The transmitter apparatus 10 has a video data acquisition block 111, a video encoder 112, an audio data acquisition block 113, an audio encoder 114, a signaling generation block 115, a signaling processing block 116, a trigger generation block 117, a multiplexer 118, and a transmission block 119.

The video data acquisition block 111 acquires video data of content (a television program, for example) from an external server, a camera, or a recording media and supplies the acquired video data to the video encoder 112 and the trigger generation block 117. The video encoder 112 encodes the video data supplied from the video data acquisition block 111 in compliance with a predetermined encoding scheme and supplies the encoded video data to the multiplexer 118.

The audio data acquisition block 113 acquires audio data of content (a television program, for example) from an external server, a microphone, or a recording media and supplies the acquired audio data to the audio encoder 114. The audio encoder 114 encodes the audio data supplied from the audio data acquisition block 113 in compliance with a predetermined encoding scheme and supplies the encoded audio data to the multiplexer 118.

The signaling generation block 115 generates signaling information that is used in the processing such as the selection or reproduction of content and supplies the generated signaling information to the signaling processing block 116. The signaling processing block 116 processes the signaling information supplied from the signaling generation block 115 and supplies the processed signaling information to the multiplexer 118. Here, LLS signaling information or SLS signaling information, for example, is generated to be processed.

The trigger generation block 117 generates trigger information with a predetermined timing and supplies the generated trigger information to the video encoder 112. In encoding the video data, the video encoder 112 embeds the trigger information supplied from the trigger generation block 117 and encodes the embedded trigger information.

The multiplexer 118 multiplexes a video stream supplied from the video encoder 112, an audio stream supplied from the audio encoder 114, and a signaling stream supplied from the signaling processing block 116 and supplies a resultant broadcast stream to the transmission block 119.

The transmission block 119 transmits the broadcast stream supplied from the multiplexer 118 as a broadcast wave (a digital broadcast signal) of digital broadcasting via an antenna 131.

An Example of Configuration of Receiver Apparatus

Referring to FIG. 17, there is depicted a diagram illustrating an example of the configuration of the receiver apparatus 20 in FIG. 1.

In FIG. 17, the receiver apparatus 20 has a control block 211, a memory 212, a recording block 213, an input block 214, a reception block 215, a demultiplexer 216, a video decoder 217, a video output block 218, an audio decoder 219, an audio output block 220, a display block 221, a speaker 222, and a communication block 223. It should be noted that, in the configuration of the receiver apparatus 20 depicted in FIG. 17, the display block 221 and the speaker 222 are included; however, it is also practicable to exclude the display block 221 and the speaker 222.

The control block 211 controls the operations of the blocks making up the receiver apparatus 20. The memory 212 is a nonvolatile memory such as NVRAM (Non Volatile Random Access Memory), for example, and records various kinds of data under the control of the control block 211. The recording block 213 is a storage such as a semiconductor memory or a hard disk drive and records data such as a viewing history log (a CDM file), for example. The input block 214 supplies a manipulation signal to the control block 211 in accordance with a manipulation done by a user.

The reception block 215 extracts a signal in accordance with a service selection manipulation from among digital broadcasting broadcast waves (digital broadcast signals) received via the antenna 231 and demodulates the extracted signal, thereby supplying a resultantly obtained broadcast stream to the demultiplexer 216.

The demultiplexer 216 separates the broadcast stream supplied from the reception block 215 into a video stream, an audio stream, and a signaling stream. The demultiplexer 216 supplies the video data to the video decoder 217, the audio data to the audio decoder 219, and the signaling information to the control block 211.

On the basis of the signaling information supplied from the demultiplexer 216, the control block 211 controls blocks such as the processing blocks of components including the demultiplexer 216 in order to reproduce the content in accordance with a service selection manipulation.

The video decoder 217 decodes the video data supplied from the demultiplexer 216 in compliance with a predetermined decoding scheme and supplies the decoded video data to the video output block 218. The video output block 218 supplies the video data supplied from the video decoder 217 to the display block 221. Consequently, the video of the content (a television program, for example) in accordance with a service selection manipulation is displayed on the display block 221.

The audio decoder 219 decodes the audio data supplied from the demultiplexer 216 in compliance with a predetermined decoding scheme and supplies the decoded audio data to the audio output block 220. The audio output block 220 supplies the audio data supplied from the audio decoder 219 to the speaker 222. Consequently, the audio of the content (a television program, for example) in accordance with a service selection manipulation is outputted from the speaker 222.

Under the control of the control block 211, the communication block 223 transfers data with servers such as the URT server 30 and the viewing history server 40 via the network 90.

Example of Functional Configuration of Control Block

Figure 18:
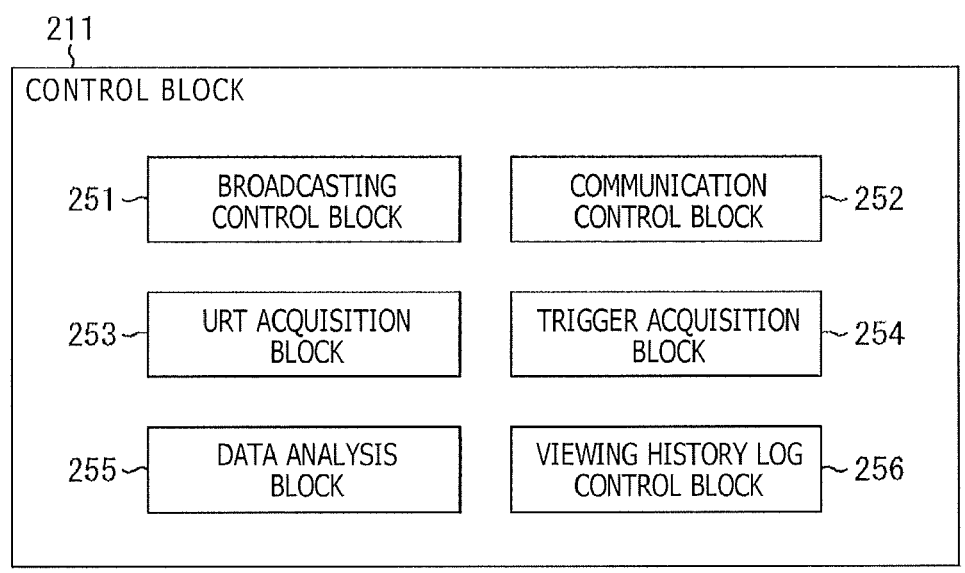
FIG. 18 is a diagram illustrating an example of a functional configuration of a control block depicted in FIG. 17.

Referring to FIG. 18, there is depicted an example of a functional configuration of the control block 211 in FIG. 17.

In FIG. 18, the control block 211 has a broadcasting control block 251, a communication control block 252, a URT acquisition block 253, a trigger acquisition block 254, a data analysis block 255, and a viewing history log control block 256.

The broadcasting control block 251 controls blocks such as the processing blocks of components including the reception block 215, the demultiplexer 216, and other blocks in order to reproduce the content included in a broadcast stream transmitted as a digital broadcast signal.

The communication control block 252 control the communication block 223 so as to transfer various kinds of data with servers such as the URT server 30 and the viewing history server 40 through network 90.

The URT acquisition block 253 acquires URT metadata received via broadcasting or via communication and supplies the acquired URT metadata to the data analysis block 255. The data analysis block 255 analyzes the URT metadata supplied from the URT acquisition block 253 and supplies the analysis results to the viewing history log control block 256. On the basis of the analysis results (of the URT metadata) supplied from the data analysis block 255, the viewing history log control block 256 controls the operations of blocks so as to execute the processing related with the viewing history log.

The trigger acquisition block 254 acquires URLR trigger information or URU trigger information received via broadcasting and supplies the received trigger information to the data analysis block 255. The data analysis block 255 analyzes the URLR trigger information supplied from the trigger acquisition block 254 and supplies the analysis results (a URT server URL) to the communication control block 252.

In addition, the data analysis block 255 analyzes the URU trigger information supplied from the trigger acquisition block 254 and supplies the analysis results to the viewing history log control block 256. On the basis of the analysis results (of the URU trigger information) supplied from the data analysis block 255, the viewing history log control block 256 controls the operations of components so as to execute the processing related with a viewing history log.
Example of Configuration of Viewing History Server Referring to FIG. 19, there is depicted an example of a configuration of the viewing history server 40 depicted in FIG. 1.

Figure 19:
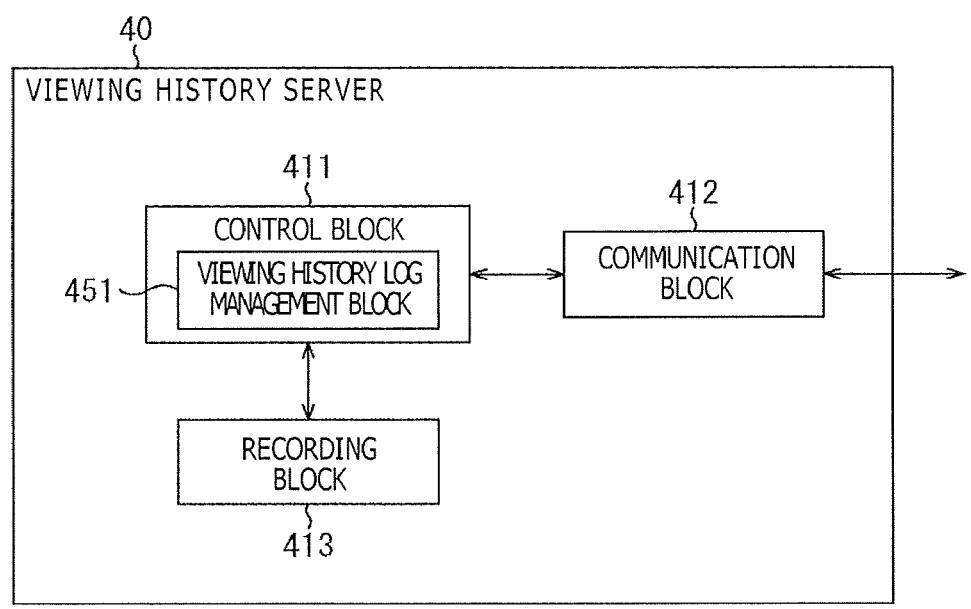
FIG. 19 is a diagram illustrating an example of a configuration of a viewing history server.

In FIG. 19, the viewing history server 40 has a control block 411, a communication block 412, and a recording block 413.

The control block 411 controls the operations of blocks of the viewing history server 40. The control block 411 includes a viewing history log management block 451. The viewing history log management block 451 manages viewing history logs and for processing.

Under the control of the control block 411, the communication block 412 receives a viewing history log transmitted from the receiver apparatus 20 via the network 90 and supplies the received viewing history log to the control block 411. The viewing history log management block 451 records the viewing history log supplied from the communication block 412 to the recording block 413. Consequently, viewing history logs sequentially transmitted from two or more receiver apparatuses 20 are collected in the recording block 413, the collected viewing history logs being accumulated for each of broadcasting organizations (broadcasting stations).

If a timing for processing a viewing history log comes the viewing history log management block 451 reads the viewing history logs accumulated for each of broadcasting organizations (broadcasting stations) from the recording block 413 and processes (analyzes) these viewing history logs. The viewing history log management block 451 supplies the processing results (viewing rating research results, for example) to the communication block 412. Under the control of the control block 411, the communication block 412 transmits the viewing history log processing results to a server or the like managed by each broadcasting organization via various networks (not depicted).
5. Flows of Processing to be Executed in Each Apparatus The following describes flows of processing operations that are executed in the apparatuses making up the transmission system 1 depicted in FIG. 1 with reference to the flowcharts depicted in FIG. 20 through FIG. 27. In what follows, the processing operations to be executed in the transmitter apparatus 10, the receiver apparatus 20, and the viewing history server 40 are sequentially described.
Transmission Processing First, with reference to the flowchart depicted in FIG. 20, a flow of the transmission processing to be executed by the transmitter apparatus 10 depicted in FIG. 1 is described.

In step S101, component processing is executed.

In this component processing, the processing for video data is executed by the video data acquisition block 111 and the video encoder 112 and the processing for audio data is executed by the audio data acquisition block 113 and the audio encoder 114. It should be noted that, if subtitle data is included in a broadcast stream, the processing for the subtitle data may be executed.

In step S102, signaling processing is executed.

In this signaling processing, the processing for signaling information is executed by the signaling generation block 115 and the signaling processing block 116. It should be noted that, here, signaling information such as LLS and SLS, for example, is generated and processed here.

In step S103, transmission processing is executed by the transmission block 119 in which a broadcast stream including the stream of each component processed in step S101 and the signaling information processed in step S102 is transmitted via the antenna 131 as a digital broadcast signal.

Figure 20:
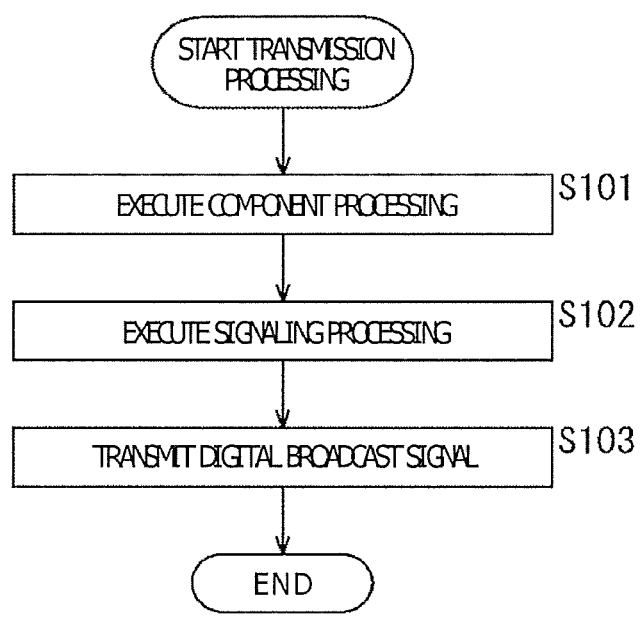
FIG. 20 is a flowchart indicative of transmitting processing.

When the processing in step S103 comes to an end, the transmission processing depicted in FIG. 20 is terminated.

So far, a flow of the transmission processing has been described.
Viewing History Log Corresponding Processing The following describes a flow of viewing history log corresponding processing to be executed by the transmitter apparatus 10 depicted in FIG. 1 with reference to FIG. 21. It should be noted that this viewing history log corresponding processing is executed in parallel with the processing in step S101 or S102 depicted in FIG. 20.

In step S111, it is determined whether the operation type of Usage Reporting is a subscription UR or an instant UR.

In step S111, if the operation type of Usage Reporting is found to be a subscription UR, then the processing goes to step S112. In step S112, it is determined whether a reception environment is direct reception or indirect reception.

In step S112, if the reception environment is found to be direct reception, then the processing goes to step S113. In step S113, the signaling generation block 115 generates URT metadata (FIG. 9). In step S114, the signaling processing block 116 processes the URT metadata generated by the processing in step S113.

Consequently, if the subscription UR (direct reception) of the first scheme is employed, URT metadata is added as the signaling information included in a broadcast stream to be transmitted as a digital broadcast signal (S103 depicted in FIG. 20).

If the reception environment is found to be trigger reception in step S112, then the processing goes to step S115. In step S115, the trigger generation block 117 generates URLR trigger information (FIG. 14). In addition, in step S116, the video encoder 112 processes the URLR trigger information generated by the processing in step S115 for the URLR trigger information to be transmitted by use of a video watermark.

Consequently, if the subscription UR (trigger reception) of the second scheme is employed, the URLR trigger information using a video watermark is added to be transmitted as a digital broadcast signal (S103 depicted in FIG. 20).

On the other hand, if the operation type of Usage Reporting is found to be instant UR in step S111, then the processing goes to step S117. In step S117, it is determined whether the reception environment is direct reception or trigger reception.

If the reception environment is found to be direct reception in step S117, then the processing goes to step S118. In step S118, the signaling generation block 115 generates URT metadata (FIG. 9). Further, the same time, in step S119, the signaling processing block 116 processes the URT metadata generated by the processing in step S118.

Consequently, if the instant UR (direct reception) of the third scheme is employed, the URT metadata is added as the signaling information included in the broadcast stream to be transmitted as a digital broadcast signal (S103 depicted in FIG. 20).

If the reception environment is determined to be trigger reception in step S117, then the processing goes to step S120. In step S120, the trigger generation block 117 generates URU trigger information (FIG. 15). In step S121, the video encoder 112 processes the URU trigger information generated by the processing in step S120 for the URU trigger information to be transmitted by use of a video watermark.

Consequently, if the instant UR (trigger reception) of the fourth scheme is employed, the URU trigger information using a video watermark is added as a video stream included in a broadcast stream and transmitted as a digital broadcast signal (S103 depicted in FIG. 20).

Figure 21:
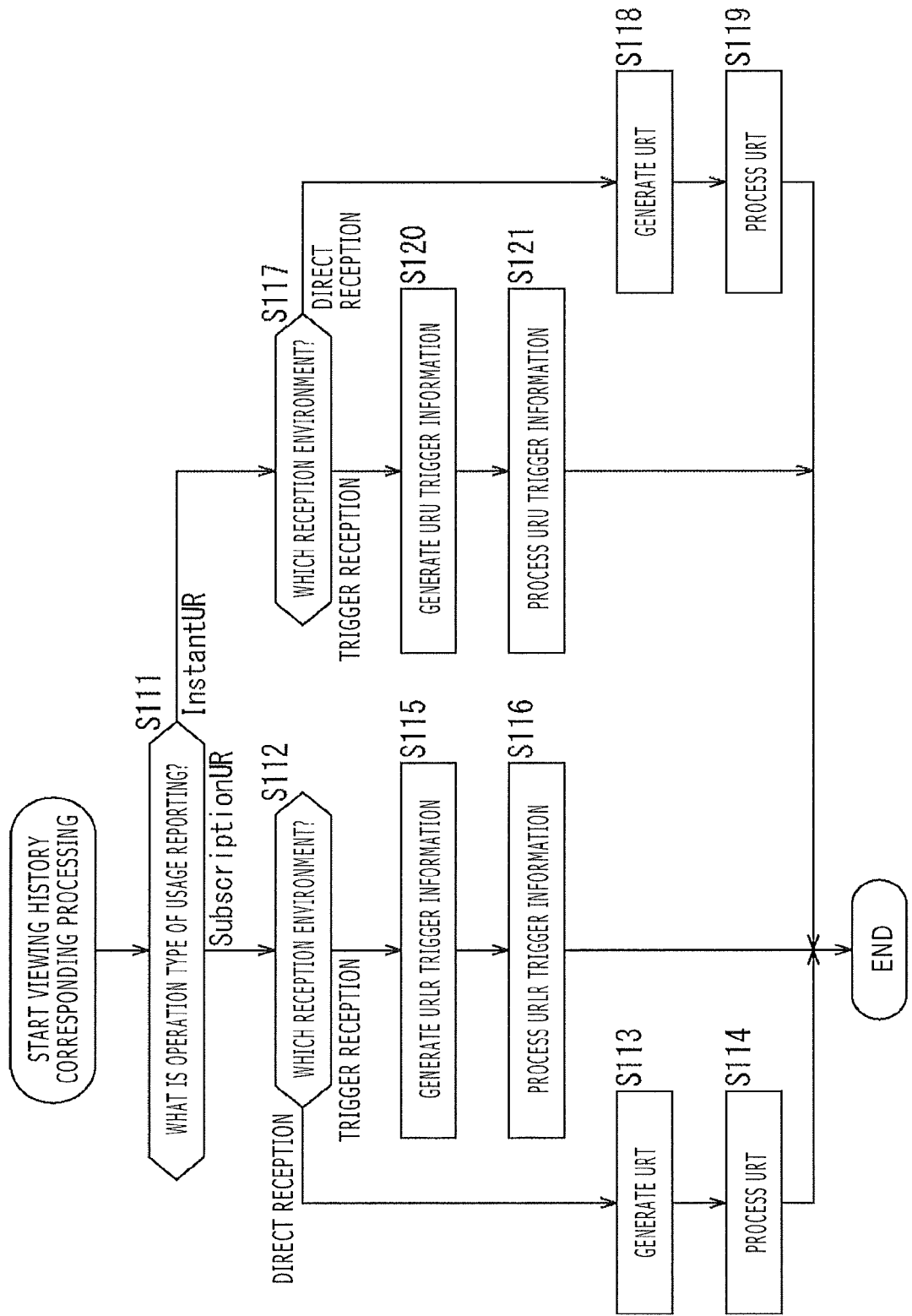
FIG. 21 is a flowchart indicative of viewing history corresponding processing.

When the procession of any one of steps S114, S116, S119, and S121 has come to an end, the viewing history corresponding processing depicted in FIG. 21 is terminated.

So far, a flow of the viewing history corresponding processing has been described. In this viewing history corresponding processing, if any one of the first scheme through the fourth scheme is employed, URT metadata, URLR trigger information, or URU trigger information is generated in accordance with the employed scheme and the generated data or information is transmitted as a digital broadcast signal.

Reception Processing

Figure 22:
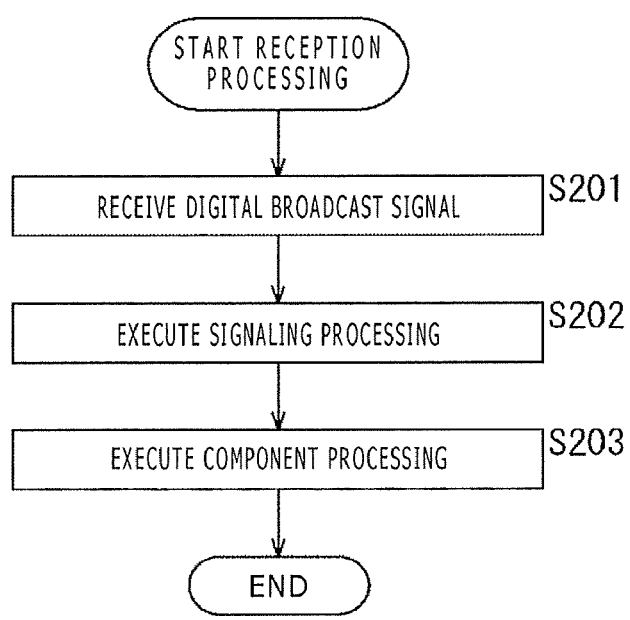
FIG. 22 is a flowchart indicative of receiving processing.

The following describes a flow of reception processing that is executed by the receiver apparatus 20 depicted in FIG. 1 with reference to the flowchart in FIG. 22.

In step S201, reception processing is executed by the reception block 215 and so on, thereby receiving a digital broadcast signal transmitted from the transmitter apparatus 10 via the transmission path 80.

In step S202, signaling processing is executed.

In this signaling processing, signaling information separated from a broadcast stream by the control block 211. Here, for example, the control block 211 controls the operations of components so as to reproduce the content corresponding to a selected service on the basis of the signaling information such as LLS or SLS.

In step S203, component processing is executed.

In this component processing, under the control of the control block 211, the processing on video data is executed by the video decoder 217 and the video output block 218 and the processing on audio data is executed by the audio decoder 219 and the audio output block 220. It should be noted that, if subtitle data is included in a broadcast stream, the processing on the subtitle data may be executed.

When the component processing is executed, the video of the content corresponding to a selected service is displayed on the display block 221 and the audio thereof is outputted from the speaker 222.

So far, a flow of the reception processing has been described.

Viewing History Corresponding Processing

The following describes a flow of viewing history corresponding processing that is executed by the receiver apparatus 20 depicted in FIG. 1; here, the viewing history corresponding processing operations corresponding to the first scheme through the fourth scheme are sequentially described.

Viewing History Corresponding Processing of First Scheme

Figure 23:
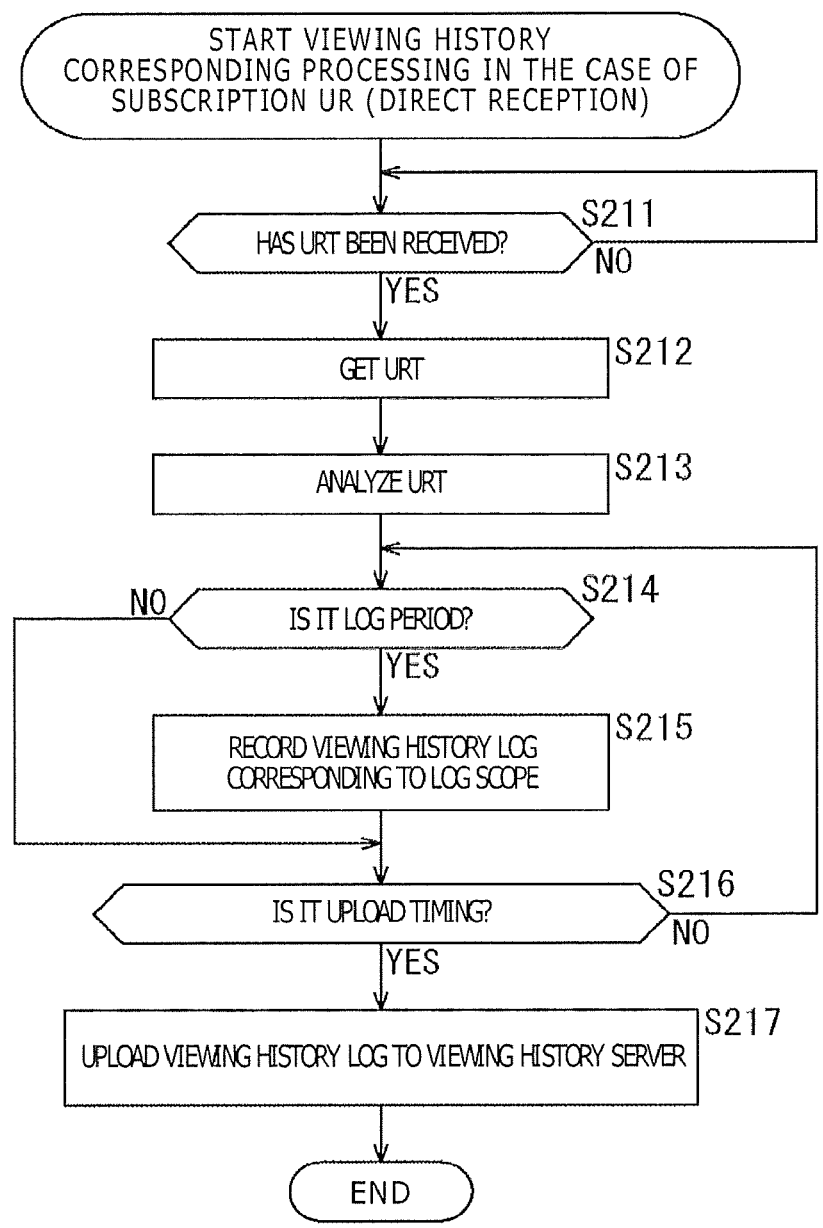
FIG. 23 is a flowchart indicative of viewing history corresponding processing to be executed in the case of subscription UR (direct reception).

First, with reference to a flowchart depicted in FIG. 23, a flow of the viewing history corresponding processing to be executed in the case of the subscription UR (direct reception) of the first scheme is described.

In step S211, the broadcasting control block 251 determines whether the URT metadata included in a digital broadcast signal has been received or not. If, in step S211, the URT metadata is found not received, then the determination processing of step S211 is repeated.

If, in step S211, the URT metadata is found received, then the processing goes to step S212. In step S212, the URT acquisition block 253 acquires the URT metadata included in the digital broadcast signal.

For example, if URT metadata is transmitted as LLS signaling information, the URT metadata is acquired at the time of initial scan processing in the receiver apparatus 20. Also, for example, URT metadata is transmitted as SLS signaling information, the most recent URT metadata is acquired when URT metadata is updated at the time of desired service selection.

It should be noted that, by giving a notification of a URT server URL from an external apparatus (not depicted) to the receiver apparatus 20 or by storing a URT server URL in advance, the receiver apparatus 20 may access the URT server 30 via the network 90 so as to acquire the URT metadata provided by the URT server 30 by following this URT server URL.

In step S213, the data analysis block 255 analyzes the URT metadata acquired by the processing in step S212. As described above with reference to FIG. 9, since this URT metadata is written with a log scope and a log period (a recording scope and a recording period) and an upload timing (transmission timing information) of a viewing history log, these pieces of information are obtained as analysis results.

In step S214, the viewing history log control block 256 determines on the basis of the analysis results obtained in step S213 whether it is a log period in which a viewing history log is recorded.

If it is found to be a log period in step S214, then the processing goes to step S215. In step S215, the viewing history log control block 256 records the viewing history log in accordance with an item (detail degree of a log) indicated by the log scope to the recording block 213.

Here, since, along with "basic" as an essential item, "component," "record," or "application" is preset as an optional item as a log scope, for example, the viewing history log control block 256 is enabled to record the basic information (the information indicative whether target content has been viewed or not) as a viewing history log (a CDM file) and, at the same time, record component information, video recording information, or application information.

When the processing in step S215 comes to an end, the processing goes to step S216. If it is found to be not log period in step S214, then the recording of a viewing history log is not executed, so that the processing in step S215 is skipped, thereby going to step S216.

If step S216, the viewing history log control block 256 determines on the basis of the analysis results obtained in step S213 whether it is an upload timing for transmitting a viewing history log.

If it is found to be not an upload timing in step S216, the processing goes back to step S214 so as to repeat the processing operations in steps S214 through S216. Consequently, viewing history logs are kept recorded in accordance with the log scope and the log period in a period until the upload timing comes.

Next, if it is determined to be an upload timing in step S216, then the processing goes to step S217. In step S217, the communication control block 252 controls the communication block 223 to transmit the viewing history log recorded by the recording block 213 to the viewing history server 40 via the network 90 by following the viewing history server URL obtained from the analysis results obtained in step S213.

For example, if a time zone 19:00 to 20:00 is daily specified for a log period of a viewing history log and a time 23:45 to 23:55 is specified every Sunday for an upload timing of the viewing history log, then, when the timing zone 19:00 to 20:00 daily comes, the viewing history log (a CDM file) in accordance with the log scope of a viewing history log is recorded in the receiver apparatus 20. Here, if "basic" and "record," for example, are specified for the log scope of a viewing history log, basic information and video recording information are recorded as the viewing history log (the CDM file).

Then, when the time 23:45 to 23:55 comes every Sunday, the receiver apparatus 20 uploads the viewing history logs (the CDM files) for one week (in the time zone 19:00 to 20:00 everyday) to the viewing history server 40 via the network 90. It should be noted that it is also practicable to upload a viewing history log only once for a particular service (a special program, for example) to the viewing history server 40 (this is a so-called one-shot upload operation), for example.

So far, a flow of the viewing history corresponding processing in the case of a subscription UR (direct reception) has been described. In this viewing history corresponding processing in accordance with the first scheme, a viewing history log in accordance with items (a log scope and a log period) specified by the broadcasting station side is recorded by following URT metadata obtained via broadcasting or via communication and, at the same time, the viewing history log is regularly uploaded to the viewing history server 40 with a timing (an upload timing) specified by the broadcasting station side.

Consequently, the log capacity of viewing history logs to be recorded to the recording block 213 can be reduced in the receiver apparatus 20, so that, even the receiver apparatus 20 limited in the capacity of the recording block 213 and therefore enabled to record only the data of the limited number of viewing history logs can execute the processing related with viewing history.

Viewing History Corresponding Processing of Second Scheme

Figure 24:
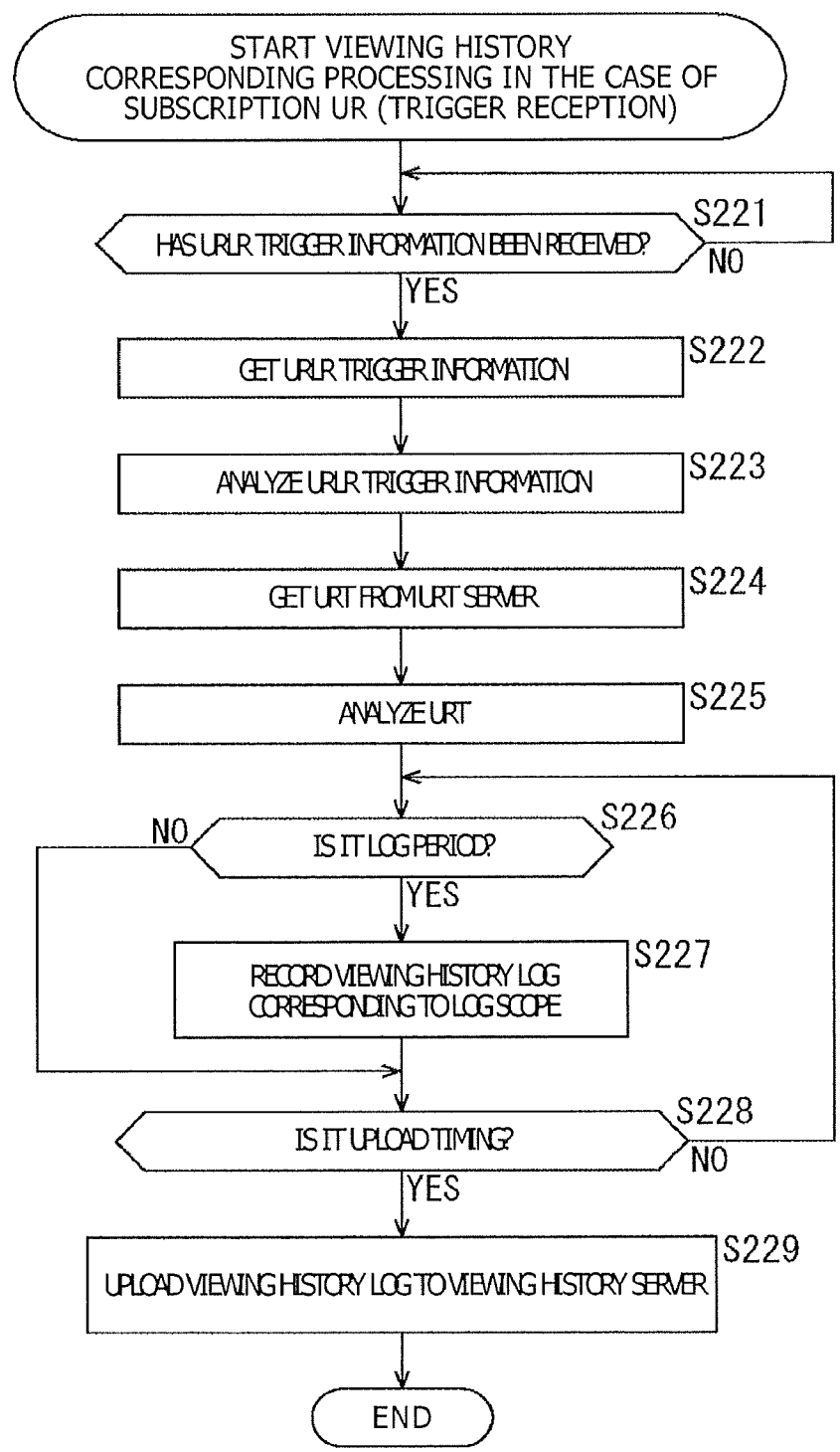
FIG. 24 is a flowchart indicative of viewing history corresponding processing in the case of subscription UR (trigger reception).

The following describes a flow of viewing history corresponding processing to be executed in the case of the subscription UR (trigger reception) of the second scheme with reference to a flowchart depicted in FIG. 24.

In step S221, the broadcasting control block 251 determines whether URLR trigger information included in a digital broadcast signal. Here, URLR trigger information is transmitted by use of a video watermark, for example. If, in step S221, URLR trigger information is found not received, then the determination processing in step S221 is repeated.

If, in step S221, URLR trigger information is found received, then the processing goes to step S222. In step S222, the trigger acquisition block 254 acquires URLR trigger information transmitted by use of a video watermark.

In step S223, the data analysis block 255 analyzes the URLR trigger information acquired by the processing in step S222. As described above with reference to FIG. 14, this URLR trigger information is written with the URT server URL of the URT server 30, so that this URT server URL is obtained as analysis results.

In step S224, the communication control block 252 controls the communication block 223 so as to access the URT server 30 via the network 90 by following the URT server URL, thereby acquiring URT metadata.

In step S225, the data analysis block 255 analyzes the URT metadata acquired by the processing in step S224. As described above with reference to FIG. 9, this URT metadata is written with a log scope and a log period (a recording scope and a recording period) and an upload timing (a transmission timing information) of a viewing history log, so that these pieces of information are obtained as analysis results.

In step S226, the viewing history log control block 256 determines on the basis of the analysis results obtained in step S215 whether it is a log period for recording a viewing history log.

If it is found to be a log period in step S226, then the processing goes to step S227. In step S227, the viewing history log control block 256 records a viewing history log in accordance with an item (detail degree of a log) indicated by the log scope to the recording block 213.

Here, since, as a log scope, "basic" is set as an essential item and "component," "record," or "application" is set as an optional item, the viewing history log control block 256 can record basic information (whether target content has been viewed or not, for example) as a viewing history log (a CDM file) and, at the same time, record component information, video recording information, or application information.

When the processing in step S227 comes to an end, the processing goes to step S228. If it is found not to be a log period in step S226, then the recording of a viewing history log is not executed, so that the processing in step S227 is skipped, thereby going to step 228.

In step S228, the viewing history log control block 256 determines on the basis of the analysis results obtained in step S225 whether it is an upload timing for transmitting a viewing history log.

If it is found not to be an upload timing in step S228, the processing goes back to step S226 so as to repeat the processing operations in steps S226 through S228. Consequently, viewing history logs are kept recorded in accordance with the log scope and the log period in a period until the upload timing comes.

Next, if it is found to be an upload timing in step S228, then the processing goes to step S229. In step S229, the communication control block 252 controls the communication block 223 to transmit the viewing history log recorded by the recording block 213 to the viewing history server 40 via the network 90 by following the viewing history server URL obtained from the analysis results obtained in step S225.

For example, if a time zone 19:00 to 20:00 is daily specified for a log period of a viewing history log and a time 23:45 to 23:55 is specified every Sunday for an upload timing of the viewing history log, then, when the timing zone 19:00 to 20:00 daily comes, the viewing history log (a CDM file) in accordance with the log scope of a viewing history log is recorded in the receiver apparatus 20. Here, if "basic" and "component," for example, are specified for the log scope of a viewing history log, basic information and component information are recorded as the viewing history log (the CDM file).

Then, when the time 23:45 to 23:55 comes every Sunday, the receiver apparatus 20 uploads the viewing history logs (the CDM files) for one week (in the time zone 19:00 to 20:00 everyday) to the viewing history server 40 via the network 90.

So far, a flow of the viewing history corresponding processing in the case of a subscription UR (trigger reception) has been described. In this viewing history corresponding processing in accordance with the second scheme, a viewing history log in accordance with items (a log scope and a log period) specified by the broadcasting station side is recorded by following URT metadata obtained via communication in accordance with the URLR trigger information and, at the same time, the viewing history log is regularly uploaded to the viewing history server 40 with a timing (an upload timing) specified by the broadcasting station side.

Consequently, the log capacity of viewing history logs to be recorded to the recording block 213 can be reduced in the receiver apparatus 20, so that, even the receiver apparatus 20 limited in the capacity of the recording block 213 and therefore enabled to record only the data of the limited number of viewing history logs can execute the processing related with viewing history. In addition, if content is provided by MVPD for providing pay broadcasting such as cable television (CATV) or the like, it is assumed that control information as signaling cannot be transmitted; however, use of URLR trigger information allows the URT server 30 to provide URT metadata regardless of reception environment.

Viewing History Corresponding Processing of Third Scheme

Figure 25:
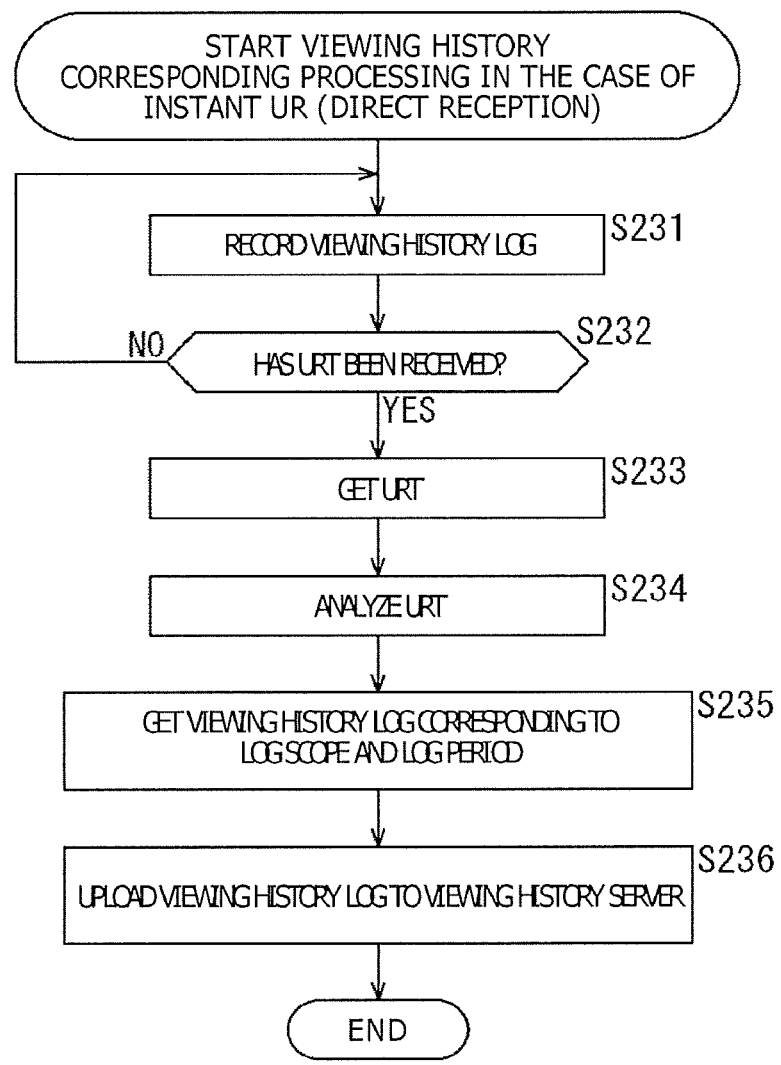
FIG. 25 is a flowchart indicative of viewing history corresponding processing in the case of instant UR (direct reception).

The following describes a flow of the viewing history corresponding processing to be executed in the case of instant UR (direct reception) of the third scheme with reference to a flowchart depicted in FIG. 25.

In step S231, the viewing history log control block 256 always records a viewing history log of a given item to the recording block 213 at the time of the reproduction of the content of all services as a product function, for example.

In step S232, the broadcasting control block 251 determines whether the URT metadata included in a digital broadcast signal. If, in step S232, the URT metadata is found not received, then the processing goes back to step S231 so as to repeat the processing therefrom. That is, viewing history logs are always kept recorded to the recording block 213 until the URT metadata is received.

On the other hand, if, in step S232, the URT metadata is found received, then the processing goes to step S233. In step S233, the URT acquisition block 253 acquires the URT metadata included in a digital broadcast signal.

It should be noted that, by giving a notification of a URT server URL from an external apparatus (not depicted) to the receiver apparatus 20 or by storing a URT server URL in advance, the receiver apparatus 20 may access the URT server 30 via the network 90 so as to acquire the URT metadata provided by the URT server 30 by following this URT server URL.

In step S234, the data analysis block 255 analyzes the URT metadata acquired by the processing in step S233. As described above with reference to FIG. 9, since this URT metadata is written with a log scope and a log period (a transmission scope and a transmission period) of a viewing history log, these pieces of information are obtained as analysis results.

In step S235, the viewing history log control block 256 (retrospectively) acquires (extracts), from among the viewing history logs always recorded to the recording block 213, the viewing history log corresponding to the log scope and the log period in accordance with the analysis results in step S234.

In step S236, the communication control block 252 controls the communication block 223 so as to transmit the (retrospectively extracted) viewing history log acquired by the processing in step S235 to the viewing history server 40 via the network 90 by following the viewing history server URL acquired from the analysis results obtained in step S234.

For example, if, in the receiver apparatus 20, always recorded viewing history logs (CDM files) for one month are accumulated in the recording block 213 and a time zone 19:00 to 20:00 every Saturday is specified as a log period of viewing history logs and "basic" and "application" are specified as the log scope, then a viewing history log (a CDM file) in accordance with these log scope and log period is extracted (cut out) from among the viewing history logs for one month. Next, of the viewing history logs (CDM files) for one month, the receiver apparatus 20 uploads a viewing history log (a CDM file) that includes the basic information and the application information in the time zone 19:00 to 20:00 every Saturday to the viewing history server 40 via the network 90.

It should be noted that, if the third scheme is employed, the receiver apparatus 20 basically extracts a viewing history log with a timing of the reception of URT metadata and uploads the extracted viewing history log to the viewing history server 40; however, it is also practicable to execute this uploading with another timing.

So far, a flow of the viewing history corresponding processing in the case of an instant UR (direct reception) has been described. In this viewing history corresponding processing in accordance with the third scheme, viewing history logs of given items are kept recorded and, at the same time, a viewing history log in accordance with items (a log scope and a log period) specified by the broadcasting station side among the always recorded viewing history logs is uploaded to the viewing history server 40 by following the URT metadata acquired via broadcasting or via communication.

It should be noted that the employment of the third scheme assumes the case in which a log capacity for recording viewing history logs is not limited because of the recording block 213 having a large recording capacity, thereby allowing the recording of log data of a large capacity; however, even if the log capacity is limited, it is practicable to always record viewing history logs in accordance with user settings and so on.

Viewing History Corresponding Processing of Fourth Scheme

Figure 26:
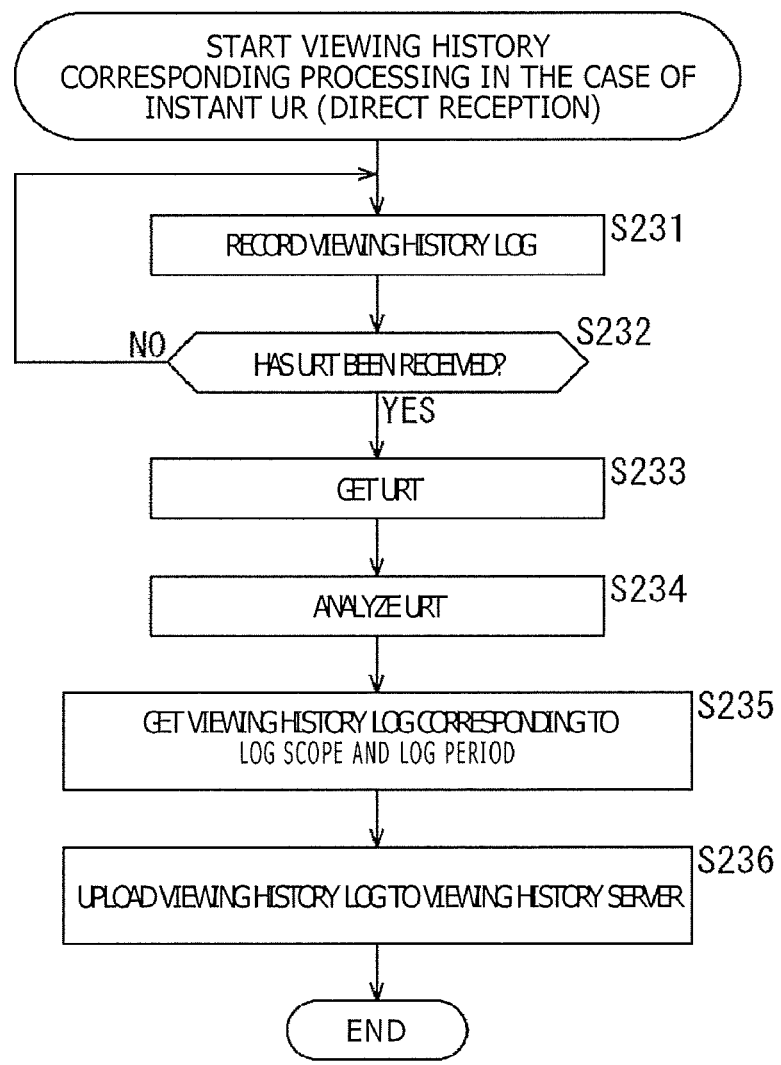
FIG. 26 is a flowchart indicative of viewing history corresponding processing in the case of instant UR (trigger reception).

Lastly, the following describes a flow of the viewing history corresponding processing to be executed in the case of instant UR (trigger reception) of the fourth scheme with reference to the flowchart in FIG. 26.

In step S241, the viewing history log control block 256 always records a viewing history log of a given item to the recording block 213 at the time of the reproduction of the content of all services as a product function, for example.

In step S242, the broadcasting control block 251 determines whether the URU trigger information included in a digital broadcast signal has been received or not. Here, the URU trigger information is transmitted by use of a video watermark, for example. If, in step S242, the URU trigger information is found not received, then the processing goes back to step S241 so as to repeat the processing therefrom. That is, viewing history logs are always kept recorded to the recording block 213 until the URU trigger information is received.

On the other hand, if, in step S242, the URU trigger information is found received, then the processing goes to step S243. In step S243, the trigger acquisition block 254 acquires the URU trigger information transmitted by use of a video watermark.

In step S244, the data analysis block 255 analyzes the URU trigger information acquired by the processing in step S243. As described above with reference to FIG. 15, since this URU trigger information is written with a log scope and a log period (a transmission scope and a transmission period) and the viewing history server URL of the viewing history server 40, these pieces of information are obtained as the analysis results.

In step S245, the viewing history log control block 256 (retrospectively) acquires (extracts), from among the viewing history logs always recorded to the recording block 213, the viewing history log corresponding to the log scope and the log period in accordance with the analysis results in step S244.

In step S246, the communication control block 252 controls the communication block 223 so as to transmit the (retrospectively extracted) viewing history log acquired by the processing in step S245 by following the viewing history server URL obtained from the analysis results in step S244 to the viewing history server 40 via the network 90.

For example, if, in the receiver apparatus 20, always recorded viewing history logs (CDM files) for one month are accumulated in the recording block 213 and a time zone 19:00 to 20:00 every Saturday is specified as a log period of viewing history logs and "basic" and "application" are specified as the log scope, then a viewing history log (a CDM file) in accordance with these log scope and log period is extracted (cut out) from among the viewing history logs for one month. Next, of the viewing history logs (CDM files) for one month, the receiver apparatus 20 uploads a viewing history log (a CDM file) that includes the basic information and the application information in the time zone 19:00 to 20:00 every Saturday to the viewing history server 40 via the network 90.

It should be noted that, if the fourth scheme is employed, the receiver apparatus 20 basically extracts a viewing history log with a timing of the reception of URU trigger information and uploads the extracted viewing history log to the viewing history server 40; however, it is also practicable to execute this uploading with another timing.

So far, a flow of the viewing history corresponding processing in the case of an instant UR (trigger reception) has been described. In this viewing history corresponding processing in accordance with the fourth scheme, viewing history logs are always kept recorded and, at the same time, of the always recorded viewing history logs, the viewing history log in accordance with the items (a log scope and a log period) specified by the broadcasting station side is uploaded to the viewing history server 40 by following the URU trigger information acquired via broadcasting.

In addition, if content is provided by MVPD for providing pay broadcasting such as cable television (CATV) or the like, it is assumed that control information as signaling cannot be transmitted; however, use of URU trigger information allows the acquisition of the control information included in the URU trigger information regardless of reception environment.

It should be noted that the employment of the fourth scheme assumes the case in which a log capacity for recording viewing history logs is not limited because of the recording block 213 having a large recording capacity, thereby allowing the recording of log data of a large capacity; however, even if the log capacity is limited, it is practicable to always record viewing history logs in accordance with user settings and so on.

Viewing History Log Collection Processing

Figure 27:
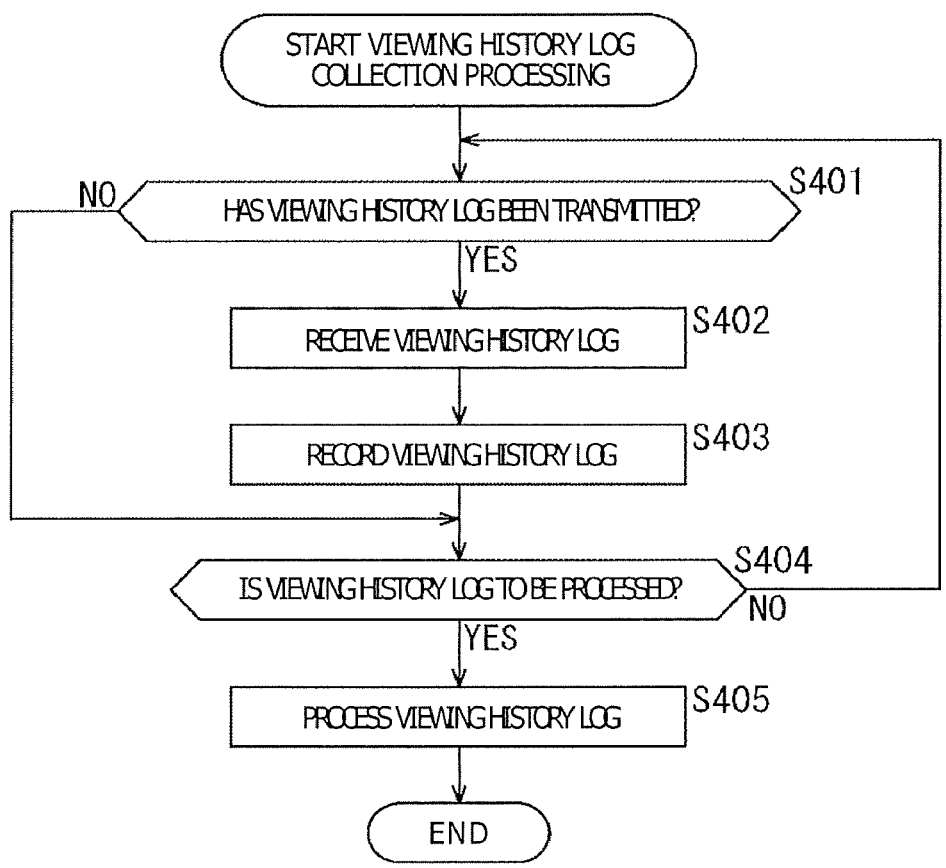
FIG. 27 is a flowchart indicative of viewing history log collection processing.

The following describes a flow of the viewing history log collection processing that is executed by the viewing history server 40 depicted in FIG. 1 with reference to the flowchart depicted in FIG. 27.

In step S401, the viewing history log management block 451 determines whether a viewing history log has been transmitted from the receiver apparatus 20 via the network 90.

If, in step S401, the viewing history log is found transmitted from the receiver apparatus 20, then the processing goes to step S402. In step S402, the communication block 412 receives the viewing history log transmitted from the receiver apparatus 20 via the network 90.

In step S403, the viewing history log management block 451 records the viewing history log received by the processing executed in step S402 to the recording block 413.

When the processing in step S403 comes to an end, the processing goes to step S404. It should be noted that, if, in step 401, the viewing history log is found not transmitted from the receiver apparatus 20, the processing operations in steps S402 and S403 are skipped and the processing goes to step S404.

In step S404, the viewing history log management block 451 determines whether the viewing history log recorded to the recording block 413 is to be processed or not.

If, in step S404, the viewing history log is found not to be processed, then the processing goes back to step S401 so as to repeat the processing therefrom. That is, the repetition of the processing operations of steps S401 through S404 allows the collection of viewing history logs transmitted from two or more receiver apparatuses 20 and the viewing history logs for each service (channel) are accumulated in the recording block 413.

On the other hand, if, in step S404, the viewing history log is found to be processed, then the processing goes to step S405. In step S405, the viewing history log management block 451 reads the viewing history log recorded (accumulated) to the recording block 413 by the processing in step S403 and processes this viewing history log.

Here, for example, the viewing history log is analyzed by the viewing history log management block 451 so as to execute researches on the viewing rating for each servicer (channel) and a viewing history report is generated for each broadcasting organization (each broadcasting station). Then, the viewing history report for each broadcasting organization is transmitted to a server, for example, managed by each broadcasting organization. When the processing in step S405 comes to an end, the viewing history log collection processing depicted in FIG. 27 is terminated.

So far, a flow of the viewing history log collection processing has been described. In this viewing history log collection processing, viewing history logs from two or more receiver apparatuses 20 are sequentially collected, the collected viewing history logs are processed (analyzed), and viewing history log processing results are obtained.

6. Variations

In the description done above, ATSC (ATSC 3.0, for example) that is a scheme employed in the United States of America and other countries as a digital broadcasting standard; however, it is also practicable to apply the present technology to ISDB (Integrated Services Digital Broadcasting) that is a scheme employed by Japan and other countries or DVB (Digital Video Broadcasting) that is a scheme employed by European countries.

The name of the signaling information such as SLT (Service List Table) and URT (Usage Report Table) mentioned above is illustrative only and therefore the signaling information may be named otherwise. Even if another name is used for the name of signaling information, it denotes that names are simply, formally changed, the substantial contents of the signaling information concerned remaining unchanged. For example, SLT may sometimes be referred to as FIT (Fast Information Table).

7. Computer Configuration

Figure 28:
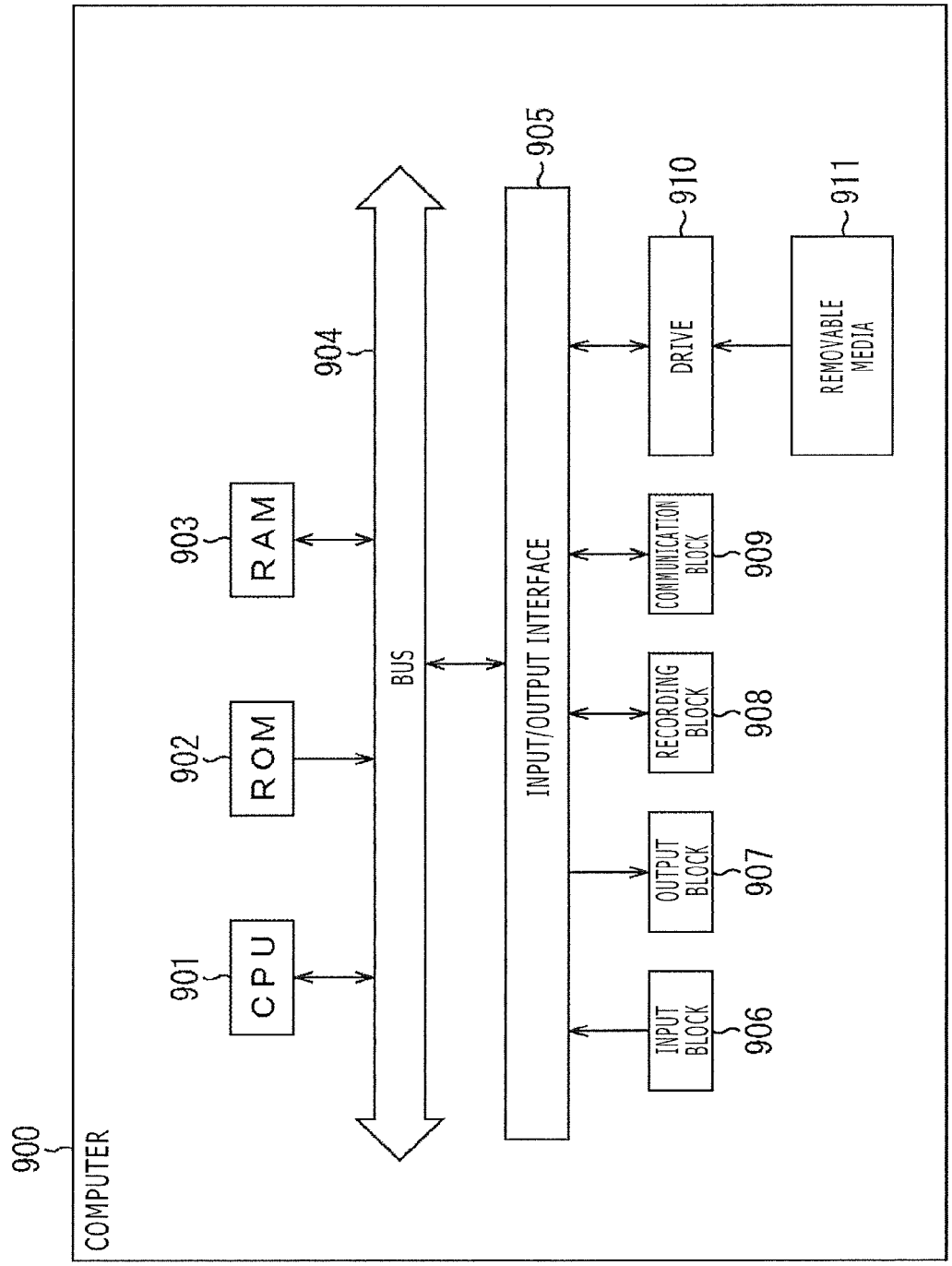
FIG. 28 is a flowchart indicative of an example of a configuration of a computer.

The sequence of processing operations described above can be executed by hardware or software. In the execution of the sequence of processing operations by software, the programs making up this software are installed on a computer. FIG. 28 is a diagram illustrating an example of a hardware configuration of a computer that is executed by the above-mentioned sequence of software programs.

In a personal computer 900, a CPU (Central Processing Unit) 901, a ROM (Read Only Memory) 902, and a RAM (Random Access Memory) 903 are interconnected through a bus 904. The bus 904 is further connected to an input/output interface 905. The input/output interface 905 is connected to an input block 906, an output block 907, a recording block 908, a communication block 909, and a drive 910.

The input block 906 is made up of a keyboard, a mouse, a microphone and so on. The output block 907 is made up of a display, a speaker, and so on. The recording block 908 is made up of a hard disc drive, a nonvolatile memory, and so on. The communication block 909 is made up of a network interface and so on. The drive 910 drives removable media 911 such as a magnetic disc, an optical disc, a semiconductor memory, or the like.

In the personal computer 900 configured as described above, the CPU 901 loads programs from the ROM 902 or the recording block 908 into the RAM 903 through the input/output interface 905 and the bus 904 so as to execute the programs, for example. Consequently, the above-mentioned sequence of processing operations are executed.

Programs to be executed by the computer 900 (or the CPU 901) are provided as recorded in the removable media 911, for example. Alternatively, the programs can be provided through wired or wireless transmission media such as local area networks, the Internet, or digital satellite broadcasting.

In the computer 900, the programs can be installed into the recording block 908 through the input/output interface 905 by loading the removable media 911 on the drive 910. In addition, the programs can be installed in the recording block 908 by receiving the programs through the communication block 909 via wired or wireless transmission media. Otherwise, the programs can be installed in the ROM 902 or the recording block 908 in advance.

It should be noted that, herein, the programs to be executed by the computer may not be executed in a time series along the sequence described as a flowchart. That is, the processing to be executed by the computer as instructed by programs includes the processing that is executed in parallel or discretely (parallel processing or object processing, for example). Further, a program may be executed by one unit of computer (processor) or two or more units of computers in a distributed manner.

While preferred embodiments of the present invention have been described using specific terms, such description is for illustrative purpose only, and it is to be understood by those skilled in the art that changes and variations may be made without departing from the spirit or scope of the following claims.

It should also be noted that the present technology can also take the following configuration:

(1)

A receiver apparatus including:

a reception block configured to receive a broadcast wave of digital broadcasting;

an acquisition block configured to acquire control information for controlling one of recording or transmission of viewing history information related with a viewing history of content that is transmitted by the broadcast wave; and a control block configured to control one of recording or transmission of the viewing history information on the basis of the control information.

(2)

The receiver apparatus according to (1) above, in which the control block records the viewing history information to a recording block in accordance with a recording scope and a recording period of the viewing history information that are specified by the control information and, in accordance with transmission timing information indicative of a timing for transmitting the viewing history information to a viewing history server for collecting the viewing history information, the transmission timing information being specified by the control information, transmits the recorded viewing history information to the viewing history server via a communication line.

(3)

The receiver apparatus according to (2) above, in which the acquisition block acquires one of the control information transmitted by the broadcast wave or the control information provided via a communication line from a control information server for providing the control information, and the control block controls one of recording or transmission of the viewing history information on the basis of the control information acquired via one of broadcasting or communication.

(4)

The receiver apparatus according to (2) above, in which the acquisition block acquires the control information via a communication line from a control information server for providing the control information on the basis of trigger information transmitted by the broadcast wave, and the control block controls one of recording or transmission of the viewing history information on the basis of the control information acquired via communication.

(5)

The receiver apparatus according to any one of (2) through (4) above, in which the recording scope of the viewing history information includes basic information about the viewing history of the content as well as information indicative whether to record one of video recording information related with video recording of the content, component information related with a component making up the content, or application information related with an application that is executed in linkage with the content, and the control block records the viewing history information to the recording block in a scope in accordance with the recording scope of the viewing history information.

(6)

The receiver apparatus according to (1) above, in which the control block always records the viewing history information to a recording block, and among the recorded viewing history information, transmits, via a communication line, viewing history information specified by the control information and in accordance with a transmission scope and a transmission period of the viewing history information to a viewing history server for collecting the viewing history information.

(7)

The receiver apparatus according to (6) above, in which the acquisition block acquires one of the control information transmitted by the broadcast wave or the control information provided via a communication line from a control information server for providing the control information, and the control block controls transmission of the viewing history information on the basis of the control information acquired via one of broadcasting or communication.

(8)

The receiver apparatus according to (6) above, in which the acquisition block controls transmission of the viewing history information on the basis of the control information included in trigger information transmitted by the broadcast wave.

(9)

The receiver apparatus according to any one of (6) through (8) above, in which the transmission scope of the viewing history information includes basic information related with a viewing history of the content as well as information indicative of whether to transmit one of video recording information related with video recording of the content, component information related with a component making up the content, or application information related with an application that is executed in linkage with the content, and the control block transmits the viewing history information to the viewing history server in a scope in accordance with the transmission scope of the viewing history information.

(10)

A data processing method including steps of:

acquiring control information for controlling one of recording or transmission of viewing history information related with a viewing history of content that is transmitted by the broadcast wave of digital broadcasting; and controlling one of recording or transmission of the viewing history information on the basis of the control information.

(11)

A transmitter apparatus including:

a generation block configured to generate control information for controlling one of recording or transmission of viewing history information related with a viewing history of content; and a transmission block configured to transmit the control information along with the content by a broadcast wave of digital broadcasting.

(12)

The transmitter apparatus according to (11) above, in which the generation block generates the control information that includes a recording scope and a recording period of the viewing history information and transmission timing information indicative of a timing with which to transmit the viewing history information to a viewing history server for collecting the viewing history information.

(13)

The transmitter apparatus according to (12) above, in which the recording scope of the viewing history information includes basic information about the viewing history of the content as well as information indicative whether to record one of video recording information related with video recording of the content, component information related with a component making up the content, or application information related with an application that is executed in linkage with the content.

(14)

The transmitter apparatus according to (11) above, in which the generation block generates the control information that includes a transmission scope and a transmission period of the viewing history information.

(15)

The transmitter apparatus according to (14) above, in which the transmission scope of the viewing history information includes basic information related with a viewing history of the content as well as information indicative of whether to transmit one of video recording information related with video recording of the content, component information related with a component making up the content, or application information related with an application that is executed in linkage with the content.

(16)

A data processing method including the steps of:

generating control information for controlling one of recording or transmission of viewing history information related with a viewing history of content; and transmitting the control information along with the content by a broadcast wave of digital broadcasting.

(17)

A transmitter apparatus including:

a trigger generation block configured to generate trigger information that includes information related with one of recording or transmission of viewing history information related with a viewing history of content; and a transmission block configured to transmit the trigger information along with the content as included in a broadcast wave of digital broadcasting.

(18)

The transmitter apparatus according to (17) above, in which the trigger generation block generates the trigger information that includes destination information of a control information server for providing control information including a recording scope and a recording period of the viewing history information and transmission timing information indicative of a timing with which to transmit the viewing history information to a viewing history server for collecting the viewing history information.

(19)

The transmitter apparatus according to (17) above, in which the trigger generation block generates the trigger information that includes a transmission scope and a transmission period of the viewing history information.

(20)

A data processing method including the steps of:

generating trigger information that includes information related with one of recording or transmission of viewing history information related with a viewing history of content; and transmitting the trigger information along with the content as included in a broadcast wave of digital broadcasting.

REFERENCE SIGNS LIST

1 . . . Transmission system, 10 . . . Transmitter apparatus, 20 . . . Receiver apparatus, 30 . . . URT server, 40 . . .

Viewing history server, 80 . . . Transmission path, 90 . . . Network, 111 . . . Video data acquisition block, 112 . . . Video encoder, 113 . . . Audio data acquisition block, 114 . . . Audio encoder, 115 . . . Signaling generation block, 116 . . . Signaling processing block, 117 . . . Trigger generation block, 118 . . . Multiplexer, 119 . . . Transmission block, 211 . . . Control block, 212 . . . Memory, 213 . . . Recording block, 214 . . . Input block, 215 . . . Reception block, 216 . . . Demultiplexer, 217 . . . Video decoder, 218 . . . Video output block, 219 . . . Audio decoder, 220 . . . Audio output block, 221 . . . Display block, 222 . . . Speaker, 223 . . . Communication block, 251 . . . Broadcasting control block, 252 . . . Communication control block, 253 . . . URT acquisition block, 254 . . . Trigger acquisition block, 255 . . . Data analysis block, 256 . . . Viewing history log control block, 411 . . . Control block, 412 . . . Communication block, 413 . . . Recording block, 451 . . . Viewing history log management block, 900 . . . Computer, 901 . . . CPU

The invention claimed is:

1. A receiver apparatus comprising:
   circuitry configured to:
   receive a digital broadcast signal;
   acquire control information for controlling generation and transmission of history information related with a viewing history of content that is transmitted by the digital broadcast signal, the control information being provided as a watermark, and the control information including a uniform resource identifier (URI) and an identifier indicating a type of the URI as a history information server URI, and the URI included in the control information including
      a first part specifying location information of a history information server, and
      a second part specifying parameters regarding a scope of the history information to be transmitted; and
   generate the history information to be transmitted in a consumption data message (CDM) in response to the control information, the generated history information including a plurality of audio visual (AV) elements, each AV element describing information corresponding to a different service, and each AV element including:
      a broadcast stream identifier that uniquely identifies a corresponding broadcast stream, and
      one or more component elements, each one of the one or more component elements including a component identifier identifying a corresponding component and a corresponding component path type identifier indicating an acquisition path type of the corresponding component.

2. The receiver apparatus according to claim 1, wherein the circuitry is further configured to:
   upload the history information to the history information server specified by the URI via a broadband communication, and
   the history information further includes:
      information about a start time and an end time of reproduction of the content, and
      application information which includes an application start time and an application end time of execution of at least one application.

3. The receiver apparatus according to claim 1, wherein the circuitry is further configured to:
   upload the history information to the history information server specified by the URI,
   the history information further includes information about a start time and an end time of reproduction of the content, and
   each component element includes a component start time and a component end time of reproduction of the corresponding component.

4. The receiver apparatus according to claim 3, wherein each component element further includes component path information which indicates an acquisition path of the corresponding component.

5. The receiver apparatus according to claim 1, wherein the acquisition path type is selected from a group that includes at least via the digital broadcast signal or via a broadband communication.

6. The receiver apparatus according to claim 1, wherein the circuitry is further configured to:
   upload the history information to the history information server specified by the URI via a broadband communication, and
   the history information includes:
      information about a start time and an end time of reproduction of the content, and
      scope information indicating items recorded in the history information.

7. The receiver apparatus according to claim 1, wherein the circuitry is further configured to receive signaling information that is a Usage Report Table (URT) which controls recording or transmission of the history information.

8. The receiver apparatus according to claim 7, wherein the signaling information is transmitted according to a Real-Time Object Delivery over Unidirectional Transport (ROUTE) protocol or MPEG Media Transport (MMT) protocol.

9. The receiver apparatus according to claim 1, wherein the CDM indicates a protocol version of the CDM.

10. A data processing method for a receiver apparatus, the method comprising:
    acquiring, by circuitry of the receiver apparatus, control information for controlling generation and transmission of history information related with a viewing history of content that is transmitted by a digital broadcast signal, the control information being provided as a watermark, and the control information including a uniform resource identifier (URI) and an identifier indicating a type of the URI as a history information server URI, and the URI included in the control information including
       a first part specifying location information of a history information server, and
       a second part specifying parameters regarding a scope of the history information to be transmitted; and
    generating the history information to be transmitted in a consumption data message (CDM) in response to the control information, the generated history information including a plurality of audio visual (AV) elements, each AV element describing information corresponding to a different service, and each AV element including:
       a broadcast stream identifier that uniquely identifies a corresponding broadcast stream, and
       one or more component elements, each one of the one or more component elements including a component identifier identifying a corresponding component and a corresponding component path type identifier indicating an acquisition path type of the corresponding component.

11. The data processing method according to claim 10, further comprising:
uploading the history information to the history information server specified by the URI via a broadband communication, wherein
the history information further includes:
information about a start time and an end time of reproduction of the content, and
application information which includes an application start time and an application end time of execution of at least one application.

12. The data processing method according to claim 10, further comprising:
uploading the history information to the history information server specified by the URI via a broadband communication, wherein
the history information further includes information about a start time and an end time of reproduction of the content, and
each component element includes a component start time and a component end time of reproduction of the corresponding component.

13. The data processing method according to claim 10, wherein
each component element further includes component path information which indicates an acquisition path of the corresponding component.

14. A transmitter apparatus comprising:
circuitry configured to:
generate control information for controlling generation and transmission of history information related with a viewing history of content, the control information being provided as a watermark, and the control information including a uniform resource identifier (URI) and an identifier indicating a type of the URI as a history information server URI, and the URI included in the control information including
a first part specifying location information of a history information server, and
a second part specifying parameters regarding a scope of the history information to be transmitted; and
transmit to a receiver apparatus, via a digital broadcast signal, the control information, wherein the receiver apparatus generates the history information to be transmitted in a consumption data message (CDM) in response to the control information, the generated history information including a plurality of audio visual (AV) elements, each AV element describing information corresponding to a different service, and each AV element including:
a broadcast stream identifier that uniquely identifies a corresponding broadcast stream, and
one or more component elements, each one of the one or more component elements including a component identifier identifying a corresponding component and a corresponding component path type identifier indicating an acquisition path type of the corresponding component.

15. The transmitter apparatus according to claim 14, wherein
the control information causes the receiver apparatus to upload the history information to the history information server specified by the URI via a broadband communication, and
the history information further includes:
information about a start time and an end time of reproduction of the content, and
application information which includes an application start time and an application end time of execution of at least one application.

16. The transmitter apparatus according to claim 14, wherein
the control information causes the receiver apparatus to upload the history information to the history information server specified by the URI via a broadband communication,
the history information further includes information about a start time and an end time of reproduction of the content, and
each component element includes a component start time and a component end time of reproduction of the corresponding component.

17. The transmitter apparatus according to claim 14, wherein
each component element further includes component path information which indicates an acquisition path of the corresponding component.

18. A data processing method for a transmitter apparatus, the data processing method comprising:
generating, by circuitry of the transmitter apparatus, control information for controlling generation and transmission of history information related with a viewing history of content, the control information being provided as a watermark, and the control information including a uniform resource identifier (URI) and an identifier indicating a type of the URI as a history information server URI, and the URI included in the control information including
a first part specifying location information of a history information server, and
a second part specifying parameters regarding a scope of the history information to be transmitted; and
transmitting to a receiver apparatus, via a digital broadcast signal, the control information, wherein the receiver apparatus generates the history information to be transmitted in a consumption data message (CDM) in response to the control information, the generated history information including a plurality of audio visual (AV) elements, each AV element describing information corresponding to a different service, and each AV element including:
a broadcast stream identifier that uniquely identifies a broadcast corresponding stream, and
one or more component elements, each one of the one or more component elements including a component identifier identifying a corresponding component and a corresponding component path type identifier indicating an acquisition path type of the corresponding component.

19. The data processing method according to claim 18, wherein
the control information causes the receiver apparatus to upload the history information to the history information server specified by the URI via a broadband communication, and
the history information further includes:
information about a start time and an end time of reproduction of the content, and
application information which includes an application start time and an application end time of execution of at least one application.

20. The data processing method according to claim 18, wherein
- the control information causes the receiver apparatus to upload the history information to the history information server specified by the URI via a broadband communication,
- the history information further includes information about a start time and an end time of reproduction of the content, and
- each component element includes a component start time and a component end time of reproduction of the corresponding component.

\* \* \* \* \*